US008188163B2

(12) United States Patent
Matsumoto et al.

(10) Patent No.: US 8,188,163 B2
(45) Date of Patent: May 29, 2012

(54) PROCESS FOR PRODUCING WATER-ABSORBING RESIN

(75) Inventors: Makoto Matsumoto, Hyogo (JP); Toshihiro Takaai, Hyogo (JP); Yorimichi Dairoku, Okayama (JP); Shinichi Fujino, Hyogo (JP); Satoshi Matsumoto, Hyogo (JP); Seiji Kato, Hyogo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 146 days.

(21) Appl. No.: 12/675,364

(22) PCT Filed: Aug. 27, 2008

(86) PCT No.: PCT/JP2008/065332
§ 371 (c)(1),
(2), (4) Date: Feb. 25, 2010

(87) PCT Pub. No.: WO2009/028568
PCT Pub. Date: Mar. 5, 2009

(65) Prior Publication Data
US 2010/0249320 A1 Sep. 30, 2010

(30) Foreign Application Priority Data
Aug. 28, 2007 (JP) .................................. 2007-221473

(51) Int. Cl.
C09B 67/00 (2006.01)
(52) U.S. Cl. ....................................... 523/330; 523/331
(58) Field of Classification Search .................. 523/330, 523/331
See application file for complete search history.

(56) References Cited

U.S. PATENT DOCUMENTS

| | | | |
|---|---|---|---|
| 4,734,478 A | 3/1988 | Tsubakimoto et al. | |
| 4,755,562 A | 7/1988 | Alexander et al. | |
| 4,783,510 A | 11/1988 | Saotome | |
| 4,824,901 A | 4/1989 | Alexander et al. | |
| 5,140,076 A | 8/1992 | Hatsuda et al. | |
| 5,206,205 A | 4/1993 | Tsai | |
| 5,385,983 A | 1/1995 | Graham | |
| 5,422,405 A | 6/1995 | Dairoku et al. | |
| 5,447,727 A | 9/1995 | Graham | |
| 5,610,208 A | 3/1997 | Dairoku et al. | |
| 5,672,633 A | 9/1997 | Brehm et al. | |
| 6,071,976 A | 6/2000 | Dairoku et al. | |
| 6,187,902 B1 | 2/2001 | Yanase et al. | |
| 6,207,796 B1 | 3/2001 | Dairoku et al. | |
| 6,239,230 B1 | 5/2001 | Eckert et al. | |
| 6,262,141 B1 | 7/2001 | Cywar et al. | |
| 6,265,488 B1 | 7/2001 | Fujino et al. | |
| 6,297,319 B1 | 10/2001 | Nagasuna et al. | |
| 6,372,852 B2 | 4/2002 | Hitomi et al. | |
| 6,472,478 B1 | 10/2002 | Funk et al. | |
| 6,514,615 B1 | 2/2003 | Sun et al. | |
| 6,559,239 B1 | 5/2003 | Riegel et al. | |
| 6,576,713 B2 | 6/2003 | Ishizaki et al. | |
| 6,605,673 B1 | 8/2003 | Mertens et al. | |
| 6,620,899 B1 | 9/2003 | Morken et al. | |
| 6,657,015 B1 | 12/2003 | Riegel et al. | |
| 6,809,158 B2 | 10/2004 | Ikeuchi et al. | |
| 6,875,511 B2 | 4/2005 | Dairoku et al. | |
| 6,906,159 B2 | 6/2005 | Dairoku et al. | |
| 7,091,253 B2 | 8/2006 | Dairoku et al. | |
| 2001/0025093 A1 | 9/2001 | Ishizaki et al. | |
| 2002/0040095 A1 | 4/2002 | Dairoku et al. | |
| 2003/0224163 A1 | 12/2003 | Dairoku et al. | |
| 2004/0106745 A1 | 6/2004 | Nakashima et al. | |
| 2005/0048221 A1 | 3/2005 | Irie et al. | |
| 2005/0054788 A1 | 3/2005 | Dairoku et al. | |
| 2006/0229370 A1 | 10/2006 | Dairoku et al. | |
| 2007/0149760 A1 | 6/2007 | Kadonaga et al. | |
| 2008/0021140 A1 | 1/2008 | Wakabayashi et al. | |
| 2008/0032035 A1* | 2/2008 | Schmidt et al. | 427/2.31 |
| 2008/0214749 A1 | 9/2008 | Weismantel et al. | |

FOREIGN PATENT DOCUMENTS

| | | |
|---|---|---|
| CN | 2765121 | 3/2006 |
| EP | 0603292 | 3/1993 |
| EP | 1367081 | 12/2003 |
| EP | 1824910 | 6/2006 |
| JP | 1111190 | 4/1989 |
| JP | 07224204 | 8/1995 |
| JP | 07242709 | 9/1995 |
| JP | 2001018222 | 1/2001 |
| JP | 2004352941 | 12/2004 |
| JP | 2008062570 | 3/2008 |
| WO | 98/49221 | 11/1998 |
| WO | 2005/014697 | 2/2005 |
| WO | 2008087114 | 7/2008 |

OTHER PUBLICATIONS

English Translation of Chinese Office Action dated Oct. 20, 2011 in CN 200880104818.0.
Office Action dated Nov. 4, 2011 in European Patent Application No. 08828813.9.

* cited by examiner

*Primary Examiner* — Edward Cain
(74) *Attorney, Agent, or Firm* — Roylance, Abrams, Berdo & Goodman, L.L.P.

(57) ABSTRACT

A water absorbent resin is dried in a continuous fluidized bed having a heat transfer tube and at least two drying rooms. Pulverization is performed between a first drying room at not less than 80° C. to not more than 200° C. and a second or subsequent room at not less than 100° C. to not more than 220° C. A method for producing a water absorbent resin includes: (1) polymerizing a monomer aqueous solution; (2) drying a hydrogel polymer of step (1); (3) performing particle size control of the dry polymer of the step (2); (5) surface crosslinking the water absorbent resin powder of step (3), and step (4) of performing a second heat drying on the water absorbent resin powder of step (3), preceding step (5). The water absorbent resin has a moisture content of 0 wt % to 3 wt % before the step (5).

26 Claims, 2 Drawing Sheets

F I G. 3
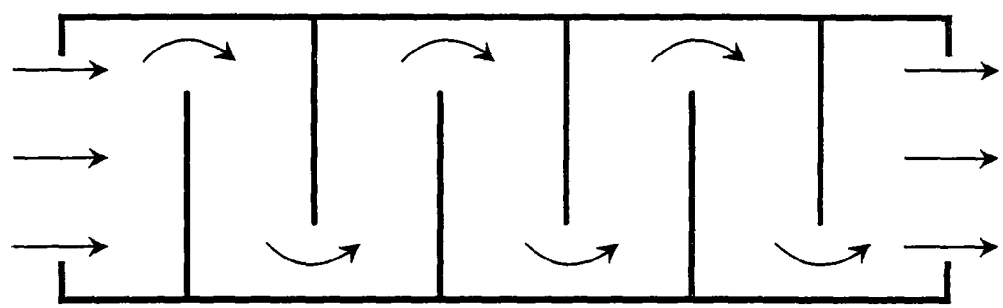

PROCESS FOR PRODUCING WATER-ABSORBING RESIN

TECHNICAL FIELD

The present invention relates to methods for producing water absorbent resins. More specifically, the present invention relates to a method for producing a water absorbent resin which method makes it possible to obtain a particulate water absorbent resin of excellent properties at low cost with high productivity.

BACKGROUND ART

A water absorbent resin absorbs a large amount of aqueous liquid whose weight is several to several hundred times as heavy as its own weight. As such, the water absorbent resin is widely used for various uses in sanitary materials (e.g., disposable diapers, sanitary napkins, and adult incontinence pads), soil water-holding agents, and the like, and are massively produced and consumed. Such a water absorbent resin (referred to also as "highly water absorbent resin" or "water absorbent polymer") is already publicly known because it is described, for example, in Japanese Industrial Standards (JIS) K7223-1996 and introduced in a large number of commercially-available reference books.

In recent years, especially for use in sanitary articles such as disposable diapers, sanitary napkins, and adult incontinence pads, the amount of water absorbent resin to be used and the amount of pulp fiber to be used tend to be increased and decreased, respectively, for the purpose of thinning the products. This makes it necessary for the water absorbent resin to take over the conventional functions of the pulp to permeate and disperse a liquid in an absorbent core. Proposed as publicly-known indices for evaluating the quality of such functions are the absorbency against pressure and liquid permeability of a water absorbent resin. Therefore, there is a demand for a water absorbent resin high in absorbency against pressure and liquid permeability. Meanwhile, the tendency toward thinning the products leads to an increase in amount of water absorbent resin to be used for each sanitary article, thereby causing a rise in demand for a low-cost water absorbent resin.

In general, a water absorbent resin is provided in powder form by drying and pulverizing a hydrogel polymer obtained by performing aqueous polymerization of a hydrophilic unsaturated monomer. The hydrogel polymer is obtained as a clump or an agglomerate of hydrogel particles. Generally, the hydrogel polymer is roughly crushed by a crusher such as a kneader, a meat chopper, or the like so as to have a particle diameter of approximately 1 mm to 10 mm. Further, the hydrogel thus roughly crushed is dried so as to have a solid content of approximately 95 wt %, and then pulverized by a pulverizer so as to have a weight-average particle diameter of not less than 300 μm to not more than 600 μm.

In the pulverization step after the drying, there occur particles whose particle diameter deviates from the desired particle diameter range. Accordingly, the polymer thus pulverized after the drying is sieved by a classifier so as to have a particle diameter falling within the desired particle diameter range. Thus obtained is a particulate water absorbent resin. Although there are variations in use, it is preferable that the particle diameter of a particulate water absorbent resin for use in sanitary articles fall within a range of not less than 150 μm to less than 850 μm.

It should be noted here that examples of a method for drying the hydrogel include a method for drying the hydrogel with the hydrogel being left at rest, a method for drying the hydrogel with the hydrogel being stirred, a method for drying the hydrogel with the hydrogel being shaken, a method for drying the hydrogel with the hydrogel flowing, and a method for drying the hydrogel with airflow (e.g., see Patent Documents 1 to 10).

Among them, Patent Document 1 discloses a method for producing a particulate water absorbent resin by drying and pulverizing a hydrous polymer immediately after polymerization and, for example, by further drying and pulverizing the particulate hydrous polymer thus pulverized. Further indicated as a method for performing the second drying is a method, such as a method for performing drying by stirring, a method for performing drying in a fluidized bed, or a method for performing drying with airflow, by which the material is moved so as to make sufficient contact with hot air or a heat transfer surface.

Further, in general, a water absorbent resin is produced through drying and surface crosslinking of a hydrogel polymer obtained by performing polymerization of an aqueous solution containing a hydrophilic monomer and a cross-linking agent. The hydrogel polymer is obtained as a clump or as an agglomerate of hydrogel particles. Generally, the hydrogel polymer is roughly crushed by a crusher such as a kneader, a meat chopper, or the like so as to have a particle diameter of approximately 1 mm to 10 mm. Further, the hydrogel thus roughly crushed is dried so as to have a solid content of approximately 95 wt %.

In the pulverization step after the drying, the hydrogel thus dried is pulverized by a pulverizer so as to have a weight-average particle diameter of not less than 300 μm to not more than 600 μm. At this time, there occur particles whose particle diameter deviates from the desired particle diameter range. Accordingly, the polymer thus pulverized after the drying is sieved by a classifier so as to have a particle diameter falling within the desired particle diameter range. Thus obtained is a particulate water absorbent resin. Although there are variations in use, it is preferable that the particle diameter of a particulate water absorbent resin for use in sanitary articles fall within a range of not less than 150 μm to less than 850 μm. After a surface cross-linking step, the water absorbent resin obtains properties, such as absorbency against pressure and liquid permeability, suitable for use in sanitary agents (sanitary materials) and the like. In the customary sense, the surface cross-linking step is a step of providing a highly cross-linked layer near the surface by bringing the water absorbent resin into reaction with a surface cross-linking agent or a polymerizable monomer.

Examples of surface cross-linking techniques hitherto discussed include: a surface cross-linking technique that involves concomitant use of a surface cross-linking agent (Patent Document 11); a surface cross-linking technique that involves an apparatus for mixing a water absorbent resin and a surface cross-linking agent (Patent Document 12); a surface cross-linking technique that involves a heating apparatus in which a water absorbent resin and a surface cross-linking agent are brought into reaction (Patent Document 13); a surface cross-linking technique that involves control of a rise in heating temperature at which a water absorbent resin and a surface cross-linking agent are brought into reaction (Patent Document 14); and a surface cross-linking technique that involves a process for surface crosslinking of a water absorbent resin with a high moisture content (Patent Document 15). Further, unlike the normal surface cross-linking treatment, there are such examples where a water absorbent resin is modified by heating without use of a surface cross-linking agent (Patent Documents 16 and 17).

Further, there have been proposed various surface crosslinking agents known as, e.g., an oxazoline compound (Patent Document 18), a vinylether compound (Patent Document 19), an epoxy compound (Patent Document 20), an oxetane compound (Patent Document 21), a polyvalent alcohol compound (Patent Document 22), a polyamide polyamine-epihalo adduct (Patent Documents 23 and 24), a hydroxyacrylamide compound (Patent Document 25), an oxazolidinone compound (Patent Document 26), a bis- or poly-oxazolidinone compound (Patent Document 27), a 2-oxotetrahydro-1,3-oxazolidine compound (Patent Document 28), and an alkylene carbonate compound (Patent Document 29). Further known are a technique for polymerization and surface crosslinking of monomers (Patent Document 30) and techniques for radical crosslinking with persulfate and the like (Patent Documents 31 and 32).

Furthermore, there have been proposed techniques that involve concomitant use of additives in mixing of surface cross-linking agents, and known as the additives are, e.g., water-soluble cations such as aluminum salt (Patent Documents 33 and 34), an alkali (Patent Document 35), and an organic acids or an inorganic acid (Patent Document 36). Further known is a technique that involves use of a particular mixer as a mixer for a surface cross-linking agent (Patent Document 37).

Further proposed are a technique for performing surface crosslinking twice in a heating step (Patent Document 38), a technique that involves use of a plurality of heat treatment apparatuses in a heating step (Patent Document 39), and techniques that involve heating of water absorbent resins before surface crosslinking (Patent Documents 40 and 41).

[Patent Document 1]
Japanese Unexamined Patent Application Publication No. 051967/2004 (*Tokukai* 2004-051967; published on Feb. 19, 2004)

[Patent Document 2]
Japanese Unexamined Patent Application Publication No. 212204/2002 (*Tokukai* 2002-212204; published on Jul. 31, 2002)

[Patent Document 3]
Japanese Unexamined Patent Application Publication No. 240914/1999 (*Tokukaihei* 11-240914; published on Sep. 7, 1999)

[Patent Document 4]
Japanese Translation of PCT Patent Application Publication No. 506363/1996 (*Tokuhyohei* 8-506363) published on Jul. 9, 1996)

[Patent Document 5]
Japanese Unexamined Patent Application Publication No. 018222/2001 (*Tokukai* 2001-018222; published on Jan. 23, 2001)

[Patent Document 6]
Japanese Translation of PCT Patent Application Publication No. 511488/2003 (*Tokuhyo* 2003-511488) published on Mar. 25, 2003)

[Patent Document 7]
Japanese Unexamined Patent Application Publication No. 212215/2000 (*Tokukai* 2000-212215; published on Aug. 2, 2000)

[Patent Document 8]
International Publication No. WO 2006/100300 (published on Sep. 28, 2006)

[Patent Document 9]
U.S. Unexamined Patent Application Publication No. 2008/0021140 (published on Jan. 24, 2008)

[Patent Document 10]
International Publication No. WO 2008/087114 (published on Aug. 4, 2008)

[Patent Document 11]
U.S. Pat. No. 5,422,405 (published on Jun. 6, 1995)

[Patent Document 12]
Japanese Unexamined Patent Application Publication No. 214734/1992 (*Tokukaihei* 4-214734; published on Aug. 5, 1992)

[Patent Document 13]
Japanese Unexamined Patent Application Publication No. 352941/2004 (*Tokukai* 2004-352941; published on Dec. 16, 2004)

[Patent Document 14]
U.S. Pat. No. 6,514,615 (published on Feb. 4, 2003)

[Patent Document 15]
U.S. Pat. No. 6,875,511 (published on Apr. 5, 2005)

[Patent Document 16]
U.S. Pat. No. 5,206,205 (published on Apr. 27, 1993) [corresponding to Japanese Unexamined Patent Application Publication 194762/1993 (*Tokukaihei* 5-194762; published on Aug. 3, 1993)]

[Patent Document 17]
European Patent No. 0603292 (published on Jun. 29, 1994)

[Patent Document 18]
U.S. Pat. No. 6,297,319 (published on Aug. 2, 2001)

[Patent Document 19]
U.S. Pat. No. 6,372,852 (published on Apr. 16, 2002)

[Patent Document 20]
U.S. Pat. No. 6,265,488 (published on Jul. 24, 2001)

[Patent Document 21]
U.S. Pat. No. 6,809,158 (published on Aug. 26, 2004)

[Patent Document 22]
U.S. Pat. No. 4,734,478 (published on Mar. 29, 1988)

[Patent Document 23]
U.S. Pat. No. 4,755,562 (published on Jul. 5, 1988)

[Patent Document 24]
U.S. Pat. No. 4,824,901 (published on Apr. 25, 1989)

[Patent Document 25]
U.S. Pat. No. 6,239,230 (published on Mar. 29, 2001)

[Patent Document 26]
U.S. Pat. No. 6,559,239 (published on Mar. 6, 2003)

[Patent Document 27]
U.S. Pat. No. 6,472,478 (published on Oct. 29, 2002)

[Patent Document 28]
U.S. Pat. No. 6,657,015 (published on Dec. 2, 2003)

[Patent Document 29]
U.S. Pat. No. 5,672,633 (published on Sep. 30, 1997)

[Patent Document 30]
U.S. Unexamined Patent Application Publication No. 2005/48221 (published on Mar. 3, 2005)

[Patent Document 31]
U.S. Pat. No. 4,783,510 (published on Nov. 8, 1988)

[Patent Document 32]
European Patent No. 1824910 (published on Aug. 29, 2007)

[Patent Document 33]
U.S. Pat. No. 6,605,673 (published on Aug. 12, 2003)

[Patent Document 34]
U.S. Pat. No. 6,620,899 (published on Sep. 16, 2003)

[Patent Document 35]
U.S. Unexamined Patent Application Publication No. 2004/106745 (published on Jun. 3, 2004)

[Patent Document 36]
U.S. Pat. No. 5,610,208 (published on Mar. 11, 1997)

[Patent Document 37]
U.S. Pat. No. 6,071,976 (published on Jun. 6, 2000)

[Patent Document 38]
U.S. Pat. No. 5,672,633 (published on Sep. 30, 1997)
[Patent Document 39]
U.S. Unexamined Patent Application Publication No. 2007/0149760 (published on Jun. 28, 2007)
[Patent Document 40]
Japanese Unexamined Patent Application Publication No. 242709/1995 (*Tokukaihei* 7-242709; published on Sep. 19, 1995)
[Patent Document 41]
Japanese Unexamined Patent Application Publication No. 224204/1995 (*Tokukaihei* 7-224204; published on Aug. 22, 1995)

SUMMARY OF INVENTION

However, the conventional drying method, such as the method of Patent Document 1 for drying a particulate water absorbent resin, has the following problems.

According to a conventional method for performing drying during production of a water absorbent resin, a hydrogel that has been roughly crushed behaves at the time of drying usually in such a manner as to require a comparatively short time to have a solid content of up to 90% but require a comparatively long time to have a solid content of more than 90%. For example, when the hydrogel is dried so that its solid content changes from 90% to 95%, the hydrogel often requires a longer time than it did when dried to have the solid content of 90%. Such drying behavior is considered to indicate behavior corresponding to a fixed-drying-rate period and a falling-drying-rate period. Therefore, in order to obtain a dry polymer having a solid content of more than approximately 90%, it is necessary to increase the residence time during which the hydrogel stays in a dryer. This results in comparatively low drying efficiency.

Furthermore, an increase in the time during which a water absorbent resin stays in a dryer means an increase in the size of the dryer. This leaves no other choice but to increase the size of production facilities. An increase in the size of the production facilities undesirably causes a rise in the cost of production of the water absorbent resin.

Furthermore, according to the conventional drying method that causes an increase in the residence time during which a material stays in a dryer, the material deteriorates under the influence of heat. This leads to degradation in properties. In order to prevent such degradation, it is necessary to improve drying efficiency and thereby shorten the residence time.

The present invention has been made in view of the foregoing problems, and it is an object of the present invention to provide a method for producing a water absorbent resin which method makes it possible to obtain a particulate water absorbent resin of excellent properties at low cost with high productivity.

A method of the present invention for producing a water absorbent resin encompasses the following methods (i) to (iv) for producing a water absorbent resin by performing drying with use of a continuous fluidized-bed dryer.

(i) A method for producing a water absorbent resin with use of a continuous fluidized-bed dryer to heat or dry a particulate water absorbent resin or a particulate hydrous cross-linked polymer thereof, the continuous fluidized-bed dryer having at least two drying rooms.

(ii) A method for producing a water absorbent resin with use of a continuous fluidized-bed dryer to heat or dry a particulate water absorbent resin or a particulate hydrous cross-linked polymer thereof, including performing pulverization of a particulate hydrous cross-linked polymer once dried with the continuous fluidized-bed dryer and then further drying the particulate hydrous cross-linked polymer with the continuous fluidized-bed dryer.

(iii) A method for producing a water absorbent resin with use of a continuous fluidized-bed dryer to heat or dry a particulate water absorbent resin or a particulate hydrous cross-linked polymer thereof, including performing drying with use of a continuous fluidized-bed dryer whose fluidized bed contains a heat transfer tube.

(iv) A method for producing a water absorbent resin with use of a continuous fluidized-bed dryer to heat or dry a particulate water absorbent resin or a particulate hydrous cross-linked polymer thereof, including performing drying at a higher temperature in a later stage of the drying than in an early stage of the drying.

That is, in order to solve the foregoing problems, a method of the present invention for producing a water absorbent resin is characterized by performing drying with use of a continuous fluidized-bed dryer having at least two drying rooms, preferably at least three drying rooms, more preferably at least four drying rooms, or especially preferably at least five drying rooms. The foregoing invention makes it possible to improve drying efficiency.

Furthermore, it is preferable that drying be performed while making (i) a ratio of an amount of a particulate hydrous cross-linked polymer to be poured per unit area of a second or subsequent drying room larger than (ii) a ratio of the amount of the particulate hydrous cross-linked polymer to be poured per unit area of a first drying room. With this, the method of the present invention for producing a water absorbent resin makes it possible to ensure high productivity. Further, an increase in amount of the particulate water absorbent resin to be poured into the second or subsequent drying room makes it possible to reduce the size of a fluidized-bed dryer (continuous fluidized-bed dryer) without an increase in floor area of the apparatus, thereby achieving a reduction in cost of production of a water absorbent resin.

In order to solve the foregoing problems, a method of the present invention for producing a water absorbent resin is characterized in performing pulverization of a particulate hydrous cross-linked polymer once dried with the continuous fluidized-bed dryer and then further drying the particulate hydrous cross-linked polymer with the continuous fluidized-bed dryer.

According to the foregoing invention, pulverization is performed in process of drying. This causes an increase in surface area of the particulate hydrous cross-linked polymer, thereby achieving a rise in rate of heat transfer of the particulate hydrous cross-linked polymer after pulverization. As a result, the method of the present invention for producing a water absorbent resin makes it possible to improve drying efficiency.

Furthermore, according to the foregoing invention, the rise in rate of heat transfer of the particulate hydrous cross-linked polymer after pulverization and the reduction in drying time make it possible to reduce thermal deterioration. With this, the particulate water absorbent resin obtained by the method of the present invention for producing a water absorbent resin has excellent properties (e.g., a relationship between absorption capacity and extractable polymer content).

Further, according to the method of the present invention for producing a water absorbent resin, it is preferable that the particulate hydrous cross-linked polymer dried before the pulverization have a solid content of not less than 80 wt % to not more than 90 wt % with respect to the after-mentioned hydrogel cross-linked polymer. The "solid content" here is defined by a loss on drying performed for three hours at 180°

C. Furthermore, according to the method of the present invention for producing a water absorbent resin, it is preferable that: the particulate hydrous cross-linked polymer, dried before the pulverization, which has a weight-average particle diameter of not less than 1 mm to not more than 5 mm be pulverized so that the particulate hydrous cross-linked polymer has a weight-average particle diameter of less than 1 mm after the pulverization, and then the particulate hydrous cross-linked polymer is further dried with the continuous fluidized-bed dryer. Furthermore, according to the method of the present invention for producing a water absorbent resin, it is preferable that the particulate hydrous cross-linked polymer be dried at a drying temperature of not less than 80° C. to not more than 200° C. before the pulverization and that the particulate hydrous cross-linked polymer be dried at a drying temperature of not less than 100° C. to not more than 220° C. after the pulverization. The "drying temperature" here is defined by the temperature of a heat medium.

A method of the present invention for producing a water absorbent resin is characterized by performing drying with use of a continuous fluidized-bed dryer whose fluidized bed contains a heat transfer tube. Further, according to the method of the present invention for producing a water absorbent resin, it is preferable that the fluidized bed have a floor-area ratio of not less than 3 to not more than 20 with respect to a surface area of the heat transfer tube.

The foregoing invention increases the amount of heat transfer by heating the particulate hydrous cross-linked polymer in the heat transfer tube contained in the fluidized bed, thereby improving drying efficiency and properties.

A method of the present invention for producing a water absorbent resin with use of a continuous fluidized-bed dryer is characterized by performing drying at a higher temperature in a later stage of the drying than in an early stage of the drying.

The foregoing invention performs drying at a low temperature in an early stage of the drying where the amount of evaporation of moisture is larger even at a comparatively low temperature and at a high temperature in a later stage of the drying where moisture becomes harder to evaporate, thereby enabling efficient drying with small energy loss. With this, the method of the present invention for producing a water absorbent resin makes it possible to improve drying efficiency.

Furthermore, the foregoing invention, the decrease in drying temperature in the early stage of the drying makes it possible to reduce thermal deterioration of the particulate water absorbent resin due to the drying. With this, the particulate water absorbent resin obtained by the method of the present invention for producing a water absorbent resin has excellent properties.

Further, it is preferable that the method of the present invention for producing a water absorbent resin include drying with use of a continuous fluidized-bed dryer whose fluidized bed has a length-to-width ratio of not less than 2 to not more than 9 in a direction of movement of the fluidized bed.

This makes it possible to dry the particulate hydrous cross-linked polymer while efficiently transporting the particulate hydrous cross-linked polymer from an inlet of the continuous fluidized-bed dryer to an outlet of the continuous fluidized-bed dryer.

Further, according to the method of the present invention for producing a water absorbent resin, it is preferable that the continuous fluidized-bed dryer have a fluidized bed provided with a stepped floor.

This makes it possible to dry the particulate hydrous cross-linked polymer while efficiently transporting the particulate hydrous cross-linked polymer from an inlet of the continuous fluidized-bed dryer to an outlet of the continuous fluidized-bed dryer. This also makes it possible to change the ratio of the amount of the particulate hydrous cross-linked polymer to be poured per unit area of a drying room. As a result, the method of the present invention for producing a water absorbent resin makes it possible to improve the drying efficiency of a particulate water absorbent resin and reduce the cost of producing a water absorbent resin.

Further, according to the method of the present invention for producing a water absorbent resin, it is preferable that the solid content of the particulate hydrous cross-linked polymer be 50 wt % to 90 wt % polyacrylic acid (salt) cross-linked polymer. The polymer is most effective in bringing about the effects of the present invention.

Meanwhile, although much has been provided such as the many surface cross-linking agents (see Patent Documents 18 to 32) and concomitant use thereof (see Patent Document 11), mixing apparatuses therefor (see Patent Documents 12 and 37), auxiliary agents for surface crosslinking (see Patent Documents 33 to 36), and heat treatment methods therefor (see Patent Documents 13, 14, and 38 to 41), the surface cross-linking technique has been insufficient to meet growing demands from users for the properties of a water absorbent resin such as absorbency against pressure and liquid permeability.

Further, there have been cases where an increase in cost, degradation in safety, degradation in other properties (e.g., degradation in coloration), and the like are found along with a change in surface cross-linking agents and use of a new auxiliary agent.

Furthermore, although the techniques exert a certain degree of effect in production on a small scale in the laboratory or batch (batch-wise) production, it sometimes did not exert as much effect in continuous production on an industrial scale (e.g., not less than 1000 kg per unit time) as it would on the small scale.

The present invention has been made in view of the foregoing problems, and it is an object of the present invention to provide a method for producing a water absorbent resin which method makes it possible to obtain a cross-linked water absorbent resin of excellent properties at low cost with high productivity.

In order to solve the foregoing problems, the inventors have conducted various studies. As a result, with attention focused on the "effects of drying of water absorbent resin powder on surface crosslinking", which has not attracted attention so far, the inventors have accomplished the present invention based on the findings that particular drying and a low moisture content before surface crosslinking greatly affect the outcome of surface crosslinking. The present invention, with attention focused on particular drying and a low moisture content before surface crosslinking, provides the following two methods for producing a water absorbent resin.

That is, a method of the present invention for producing a water absorbent resin is a method for producing a water absorbent resin, including a sequence of the steps of (1) polymerizing a monomer aqueous solution, (2) drying a hydrogel polymer obtained in the step (1), (3) performing particle size control by either pulverizing or pulverizing and classifying a dry polymer obtained in the step (2), (5) performing surface crosslinking on water absorbent resin powder whose particle size has been controlled in the step (3), the method further including the step (4) of performing second heat drying on the water absorbent resin powder whose particle size has been controlled in the step (3), the step (4) preceding the step (5).

Further, a method of the present invention for producing a water absorbent resin is a method for producing a water absorbent resin, including a sequence of the steps of (1) polymerizing a monomer aqueous solution, (2) drying a hydrogel polymer obtained in the step (1), (3) performing particle size control by either pulverizing or pulverizing and classifying a dry polymer obtained in the step (2), (5) performing surface crosslinking on water absorbent resin powder whose particle size has been controlled in the step (3), the water absorbent resin having a moisture content (defined by a loss on drying performed for three hours at 180° C.) of 0 wt % to 3 wt % before it is subjected to the surface cross-linking step (5).

The foregoing invention makes it possible, in surface crosslinking of a water absorbent resin, to improve the properties (e.g., absorbency against pressure AAP, liquid permeability SFC) of the surface cross-linked water absorbent resin without a change in surface cross-linking agents or use of an auxiliary agent. Further, whereas there has conventionally been degradation in properties along with a scale-up in a production step, the foregoing invention is almost free from degradation in properties even in serial production or scale-up.

Additional objects, features, and strengths of the present invention will be made clear by the description below. Further, the advantages of the present invention will be evident from the following explanation in reference to the drawings.

BRIEF DESCRIPTION OF DRAWINGS

FIG. 3 is a cross-sectional view of a fluidized-bed dryer of Example 2 taken in a horizontal direction.

REFERENCE SIGNS LIST

Figure 1:
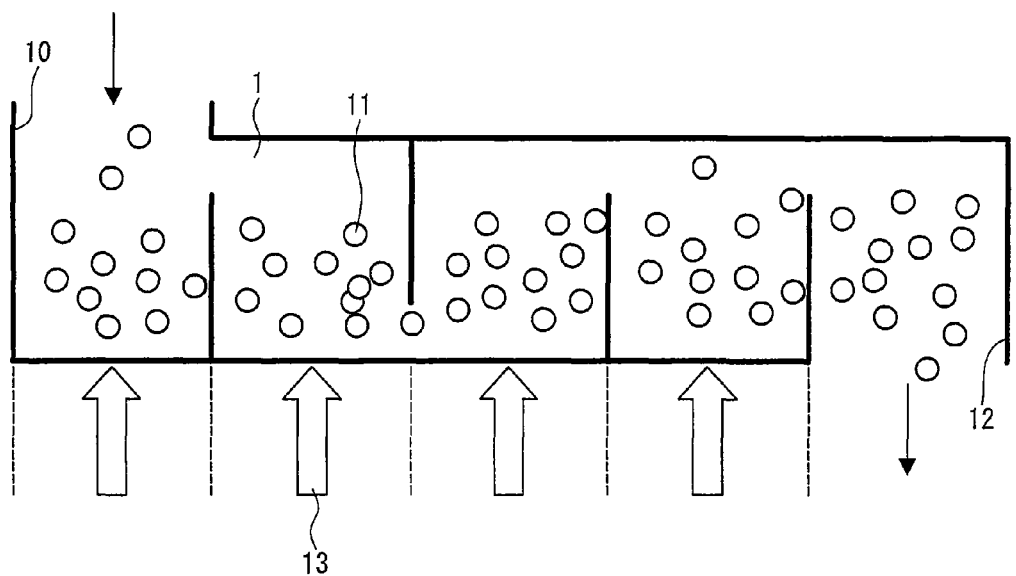
FIG. 1 is a cross-sectional view of a four-room fluidized-bed dryer according to the present invention.
Figure 2:
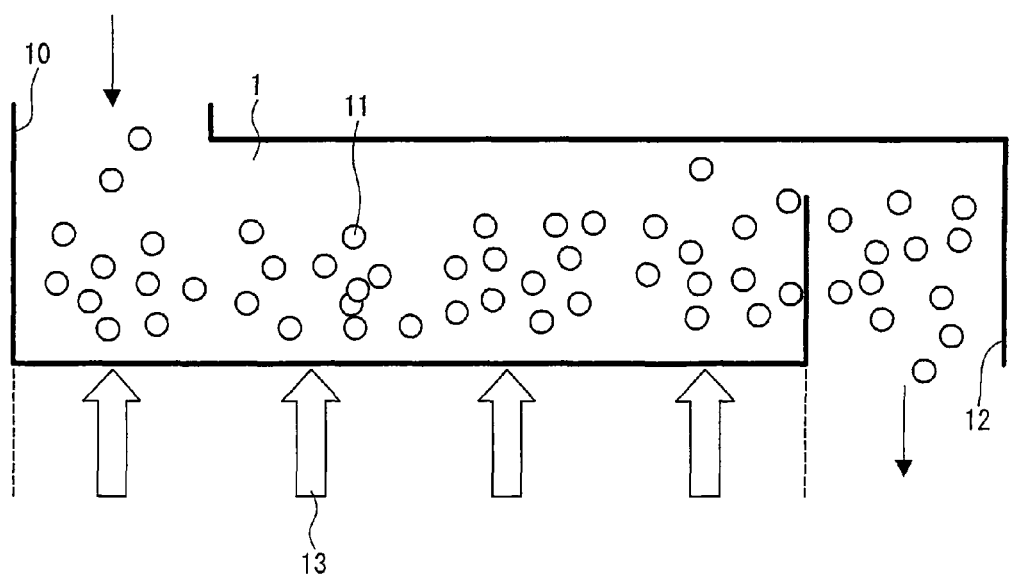
FIG. 2 is a cross-sectional view of a conventional one-room fluidized-bed dryer.

1 Fluidized-bed dryer (continuous fluidized-bed dryer)
10 Inlet
11 Particulate hydrous cross-linked polymer
12 Outlet
13 Hot air

DESCRIPTION OF EMBODIMENTS

The present invention will be described below in detail. However, the scope of the present invention is not limited to these descriptions. Proper variations other than those exemplified below may be carried out within the spirit of the present invention. Specifically, the present invention is not limited to the description of the embodiments below, but may be variously altered within the scope of the claims. An embodiment based on a proper combination of technical means disclosed in different embodiments is encompassed in the technical scope of the present invention. It should be noted that the terms "mass" and "weight" are synonymous with each other in this specification.

[Embodiment 1]
One embodiment of the present invention will be described below.
(I) Particulate Water Absorbent Resin
(A) Polyacrylate Salt Water Absorbent Resin
A water absorbent resin that is obtained by a method of the present invention for producing a water absorbent resin can be widely applied to various polymer structures, but is optimally a polyacrylate salt water absorbent resin, or preferably a water-swelling and water-insoluble cross-linked polymer containing an acrylic acid (salt) at 30 mol % to 100 mol %, more preferably 50 mol % to 100 mol %, still more preferably 70 mol % to 100 mol %, or especially preferably 90 mol % to 100 mol %, out of the recurring units (exclusive of the cross-linking agent). The term "water-swelling" here means that the after-mentioned absorption capacity (GV) is not less than 5 g/g, or more preferably not less than 10 g/g. Further, the term "water-insoluble" here means that the after-mentioned water-soluble component occupies not more than 50%, more preferably not more than 30%, or especially preferably not more than 20%.

An acrylic acid salt or an acrylic acid group serving as a recurring unit of a polymer is neutralized as a monohydric salt, more preferably alkali metal salt or ammonium salt, still more preferably alkali metal salt, or especially preferably sodium salt, within a range of 0 mol % to 100 mol %, more preferably 20 mol % to 100 mol %, still more preferably 50 mol % to 99 mol %, or still more preferably 60 mol % to 90 mol %.

Examples of an unsaturated monomer that can be used include: hydrophilic monomers such as acrylic acid, methacrylic acid, maleic acid (anhydride), fumaric acid, crotonic acid, itaconic acid, vinyl sulfonic acid, 2-(meth)acrylamide-2-methylpropane sulfonic acid, (meth)acryloxyalkane sulfonic acid, N-vinyl-2-pyrrolidone, N-vinylacetamide, (meth)acrylamide, N-isopropyl(meth)acrylamide, N,N-dimethyl (meth)acrylamide, 2-hydroxyethyl(meth)acrylate, methoxypolyethyleneglycol(meth)acrylate, and polyethyleneglycol(meth)acrylate; and salts thereof. Among these monomers, for example, it is possible to appropriately obtain a water absorbent resin from acrylic acid alone, from a combination of acrylic acid and a monomer other than acrylic acid, or from a monomer other than acrylic acid alone.

From the point of view of the properties (absorption capacity, extractable polymer content, residual monomer, liquid permeability, and the like) of the water absorbent resin, it is preferable to use acrylic acid and/or a salt thereof. In the case of use of acrylic acid and/or a salt thereof as an unsaturated monomer, it is most preferable to use acrylic acid (salt) composed of a 1 mol % to 50 mol % acrylic acid and a 50% to 99% alkali metal salt.

Examples of a cross-linking agent that can be used include: compounds, each having at least two polymerizable double bonds in its molecule, such as N,N'-methylenebis(meth)acrylamide, (poly)ethyleneglycol di(meth)acrylate, (poly)propyleneglycol di(meth)acrylate, (polyoxiethylene)trimethylolpropanetri(meth)acrylate, trimethylolpropanedi(meth) acrylate, (poly)ethyleneglycol de(β-acryloyloxipropinate), trimethylolpropane tri(β-acryloyloxipropionate), and poly (meth)allyloxyalkane; and compounds, each capable of forming a covalent bond by reacting with a carboxylic group, such as polyglycidyl ether (ethyleneglycol diglycidyl ether), polyol (ethyleneglycol, polyethyleneglycol, glycerin, sorbitol). These compounds may be used alone or in combination of two or more of them.

In the case of use of a cross-linking agent, it is preferable to essentially use a compound having at least two polymerizable double bonds in its molecule, in consideration of the water absorbent properties and the like of the resulting water absorbent resin. Further, in view of the properties of the cross-linking agent, it is preferable that the cross-linking agent be used in an amount of 0.0001 mol % to 5 mol %, or more preferably 0.005 mol % to 2 mol %, with respect to the above monomer.

These monomers are usually polymerized in an aqueous solution, and the monomer concentration preferably falls within a range of 10 wt % to 90 wt %, more preferably 20 wt % to 80 wt %, still more preferably 30 wt % to 70 wt %, or especially preferably 40 wt % to 60 wt %. Further, the aqueous solution may also contain a surfactant, polyacrylic acid (salt) or a cross-linked polymer thereof (water absorbent resin), starch, a polymer compound such as polyvinyl alcohol, various chelating agents, various additives, and the like at 0 wt % to 30 wt % with respect to the above monomer. The "aqueous solution" in the present application encompasses a dispersion liquid exceeding a saturated concentration, but is preferably polymerized at a saturated concentration or below.

(B) Polymerization Step

The water absorbent resin of the present invention is produced by obtaining a hydrous cross-linked polymer with cross-linking polymerization of the aforementioned unsaturated monomer. From the point of view of performance and ease of control of the polymerization, the polymerization method is usually performed by spraying polymerization, dropping polymerization, aqueous polymerization, or reversed-phase suspension polymerization.

In order to bring more of the effects of the present invention, it is preferable to adopt aqueous polymerization or reversed-phase suspension polymerization, more preferably aqueous polymerization, still more preferably continuous aqueous polymerization, or especially preferably continuous belt polymerization or continuous kneader polymerization. From a point of view of properties and drying efficiency, it is preferable to volatilize at least part of the polymerization solvent by heat of polymerization at the time of polymerization. For example, it is only necessary to raise the solid content by not less than 0.1 wt %, preferably 1 wt % to wt %, more preferably 2 wt % to 30 wt %, especially preferably 3 wt % to 20 wt %, during the polymerization. The rise in solid content is appropriately determined by polymerization temperature (e.g., polymerization at a boiling point), an air current, shape (e.g., the particle diameter of a polymer gel or the thickness of a sheet), and the like.

These polymerizations can be performed in an air atmosphere, but it is preferable that these polymerizations be performed in an atmosphere of an inert gas such as nitrogen and argon (e.g., at an oxygen concentration of not more than 1%). Further, it is preferable that the monomer component be used for polymerization after oxygen dissolved therein is sufficiently substituted by an inert gas to be at an oxygen concentration of less than 1 ppm.

The reversed-phase suspension polymerization is a polymerization method by which a monomer aqueous solution is suspended in a hydrophobic organic solvent. For example, the polymerization method is described in U.S. patents such as U.S. Pat. Nos. 4,093,776, 4,367,323, 4,446,261, 4,683,274, and 5,244,735. The aqueous polymerization is a method by which a monomer aqueous solution is polymerized without using any dispersion solvent. For example, the polymerization method is described in U.S. patents such as U.S. Pat. Nos. 4,625,001, 4,873,299, 4,286,082, 4,973,632, 4,985,518, 5,124,416, 5,250,640, 5,264,495, 5,145,906, and 5,380,808, and European patents such as European Patent No. 0811636, European Patent No. 0955086, European Patent No. 0922717, and European Patent No. 1178059. It should be noted that, in performing polymerization, it is possible to use, in the present invention, monomers, cross-linking agents, polymerization initiators, and other additives that are described in these patent documents.

Examples of a polymerization method for aqueous polymerization include a static polymerization method for performing polymerization in a monomer aqueous solution at rest and a stirring polymerization method for performing polymerization in a stirring apparatus. As for the static polymerization method, it is preferable that an endless belt be used. As for the stirring polymerization method, a stirring machine, such as a kneader, which has a plurality of stirring screws is preferably used, although a single-screw stirring machine can be used. More specific examples of the method of the present invention for polymerization include such a method for performing continuous polymerization at a high monomer concentration with use of an endless belt as described in Japanese Unexamined Patent Application Publication No. 307195/2005 (*Tokukai* 2005-307195). Such continuous belt polymerization or continuous kneader polymerization is suitably applied to the present invention, too.

A polymerization initiator for use in the present invention is appropriately selected depending on the mode of polymerization. Examples of such a polymerization initiator include a photolytic polymerization initiator, a pyrolytic polymerization initiator, and a redox polymerization initiator. Examples of the photolytic polymerization initiator include benzoin derivatives, benzyl derivatives, acetophenone derivatives, benzophenone derivatives, and azo compounds. Further, examples of the pyrolytic polymerization initiator include: persulfates such as sodium persulfate, potassium persulfate, and ammonium persulfate; peroxides such as hydrogen peroxide, t-butyl peroxide, and methyl ethyl ketone peroxide; and azo compounds such as azonitrile compounds, azoamidine compounds, cyclic azoamidine compounds, azoamide compounds, alkyl azo compounds, 2,2'-azobis (2-amidinopropane)dihydrochloride, and 2,2'-azobis [2-(2-imidazoline-2-yl)propane]dihydrochloride. Examples of the redox polymerization initiator include a redox polymerization initiator obtained by combining a reducing compound such as L-ascorbic acid or sodium bisulfite with the foregoing persulfate or peroxide.

Further, in the present invention, it is preferable that the photolytic polymerization initiator and the pyrolytic polymerization initiator be used in combination. The polymerization initiator is used in an amount of 0.0001 mol % to 1 mol %, or preferably from 0.001 mol % to 0.5 mol %, with respect to the above monomer.

More specific examples of the method of the present invention for polymerization include such a method for performing continuous polymerization at a high monomer concentration with use of an endless belt as described in Japanese Unexamined Patent Application Publication No. 307195/2005 (*Tokukai* 2005-307195). Continuous belt polymerization and continuous kneader polymerization are preferred because they make it easy to obtain a high-concentration hydrous cross-linked polymer that can be applied suitably to the present invention.

(C) Gel Granulation Step

From a point of view of properties and drying efficiency, it is preferable that the hydrogel polymer before drying be granulated during or after polymerization.

In case of use of aqueous polymerization or, in particular, continuous belt polymerization for polymerization in the present invention, the hydrous cross-linked polymer obtained in the form of a clump, a sheet, or the like the through aqueous polymerization in the polymerization step is dried after being crushed by a crushing apparatus into a particulate hydrous cross-linked polymer. Further, spraying polymerization, dropping polymerization, and reversed-phase suspension polymerization give a particulate hydrous cross-linked polymer by polymerization, and the particulate hydrous cross-linked polymer after polymerization may be dried directly, or may be crushed or granulated as needed for particle size adjustment. It is preferable that the particulate hydrous cross-linked polymer have a weight-average particle diameter falling within a range of 0.5 mm to 10 mm, more preferably 1 mm to 5 mm, still more preferably 1 mm to 3 mm, or especially preferably 1 mm to 2 mm. The weight-average particle diameter is calculated by the after-mentioned measurement (standard sieve classification). If the weight-average particle diameter exceeds 10 mm, it undesirably becomes difficult to fluidize the particulate hydrous cross-linked polymer in a fluidized bed as described below and it undesirably becomes necessary to increase the amount of air to let into the bed.

It should be noted that applicable examples of a method for controlling the weight-average particle diameter within the aforementioned range in the gel granulation step are described in U.S. Pat. Nos. 6,906,159, 5,275,773, 6,100,305, 6,140,395, 6,875,511, U.S. Unexamined Patent Application Publication No. 2004/234607, U.S. Unexamined Patent Application Publication No. 2005/46069, and the like.

(D) Drying Step

The present invention relates to a method for producing a water absorbent resin which method includes a step of drying the particulate hydrous cross-linked polymer obtained by roughly crushing the hydrous cross-linked polymer in the gel granulation step. The following fully describes the drying step.

It is preferable that the particulate hydrous cross-linked polymer for use in the present invention has a solid content (defined by a loss on drying performed for three hours at 180° C.) of not less than 50 wt %, or more preferably not less than 60 wt %, not less than 65 wt %, or not less than 70 wt %. A low solid content makes flow difficult. Further, although appropriately adopted, the upper limit is normally not more than 100 wt %, preferably not more than 95 wt %, or more preferably not more than 90 wt %.

First, according to a first preferred embodiment, it is preferable that the particulate hydrous cross-linked polymer have a solid content of not less than 70% (with respect to the hydrogel cross-linked polymer) when dried with use of a continuous fluidized-bed dryer. Examples of a method for causing the particulate hydrous cross-linked polymer to have a solid content of not less than 70% when dried as described above include a method for producing an increase in monomer concentration during the polymerization, a method for raising a solid content by volatilizing a solvent during the polymerization, a method for drying the hydrogel cross-linked polymer after the polymerization, a method for performing drying during the gel granulation, and a method for performing drying after the gel granulation. However, the method is not particularly limited as long as it can cause the particulate hydrous cross-linked polymer to be dried to have a solid content of not less than 70%. Further, in cases where the solid content of the particulate hydrous cross-linked polymer is lower than 70%, e.g., in cases where the solid content is less than 50% to 70%, it is only necessary to impart fluidity to the polymer gel with addition of an ordinary plasticizer, an ordinary mold-releasing agent, or the like.

According to the method of the present invention for producing a water absorbent resin, it is preferable that the particulate hydrous cross-linked polymer be dried with use of a continuous fluidized-bed dryer having at least two drying room, more preferably at least three drying rooms, especially preferably at least four drying rooms, or most preferably at least five drying rooms. Normally, the upper limit of drying rooms is preferably not more than 100, more preferably not more than 50, or still more preferably 30, although it varies depending on the drying time (residence time during which the particulate hydrous cross-linked polymer stays in the drying rooms). An excessively large number of drying rooms cause a reduction in conveyability of the particulate hydrous cross-linked polymer from one drying room to another. Further, the drying time (residence time) is appropriately selected according to conditions and purposes. However, from the point of view of the properties and cost of the resulting water absorbent resin, it is preferably that the drying time (residence time) fall within a range of 1 minute to 3 hours, more preferably 1 minute to 1 hour, or especially preferably 5 minutes to 1 hour.

As for the continuous fluidized-bed dryer that dries the particulate hydrous cross-linked polymer, it was found that an increase in the number of drying rooms leads to improvement in drying efficiency even under the same air-volume and air-temperature conditions with throughput held constant and to improvement in properties of the dry polymer. The possible reason for this is that as the number of drying rooms increases, the internal temperature (i.e., material temperature or hot-air temperature) of the first drying room becomes comparatively low, while the internal temperature of the last drying room becomes comparatively high. That is, the material temperature (temperature of the particulate hydrous cross-linked polymer) is comparatively low in an early stage of the drying where the particulate hydrous cross-linked polymer contains a relatively large amount of moisture, so that a reduction in thermal deterioration is implied. Furthermore, since it is considered that an increase in the number of drying rooms causes the movement of the particles from the inlet to the outlet to be more like a so-called piston flow, the uniformity of dryness among the particles is presumably increased or the uniformity of surface cross-linked conditions in the subsequent surface cross-linking step is presumably increased, so that the performance of the water absorbent resin is also improved.

The term "flow" here means "moving in a stream" or "moving unsettled". Further, the term "fluidized bed" here means a bed on which particles flows due to equilibrium between upward force applied by blowing gas through the bottom of a container (apparatus) filled with particles and gravity. The term "fluidized-bed dryer" here means an apparatus that dries particles fluidized by blowing air from the bottom.

Further, the phrase "having at least two drying rooms" means that there are at least two drying rooms, i.e., a plurality of drying rooms.

Examples of a method for pluralizing a drying room of a continuous fluidized-bed dryer include a method for dividing the space by providing a partition plate in the fluidized bed and a method for coupling two continuous fluidized-bed dryers. In case of dividing the fluidized bed into a plurality of drying rooms by providing a partition plate in the fluidized bed, it is usual to provide a gap at the bottom (bed surface), the top, or the side wall of the partition plate so that the particulate hydrous cross-linked polymer can move from one space to another.

It should be noted that the gap formed by the partition plate only needs to be provided at at least one of the bottom, the top, and the side wall. In some cases, an opening may be provided in a central or intermediate portion so as to allow movement.

That is, the movement of the particulate hydrous cross-linked polymer, supplied into the continuous fluidized-bed dryer, to the next drying room, e.g., from the first drying room to the second drying time takes the form of an under flow of the particulate hydrous cross-linked polymer via the partition plate having the gap, an over flow of the particulate hydrous cross-linked polymer via the partition plate having the gap, a side flow of the particulate hydrous cross-linked polymer via the partition plate having the gap, or a combination thereof.

The ratio of the cross-sectional area of a partition plate constituting a drying room in a continuous fluidized-bed dryer to the cross-sectional area of an opening (gap) thereof (cross-sectional area of partition plate/cross-sectional area of opening) preferably falls within a range of 1000/1 to 1/9, more preferably 100/1 to 1/1, still more preferably 50/1 to 1/9, or even more preferably 50/1 to 1/1. Outside of the range, the particulate hydrous cross-linked polymer suffers from defects in movement, and such defects undesirably causes degradation in properties due to excessive drying or results in incomplete drying.

According to the method of the present invention for producing a water absorbent resin, it is preferable to perform drying while making the amount of the particulate hydrous cross-linked polymer to be poured (accumulated) per unit area of fluidized bed larger in a second or subsequent drying room than in a first drying room. The term "first drying room" here means, in a continuous fluidized-bed dryer having at least two drying rooms, the first drying room in a path for the drying of the particulate hydrous cross-linked polymer. Further, the term "second or subsequent drying room" here means, in the continuous fluidized-bed dryer having at least two drying rooms, a room subsequent to the first drying room in the path for the drying of the particulate hydrous cross-linked polymer. It should be noted here that the rate of increase defined by the ratio the amount of the particulate hydrous cross-linked polymer to be poured (accumulated) per unit area of fluidized bed between the fluidized beds falls within a range of, e.g., 1.01 to 10 times, preferably 1.05 to 5 times, or more preferably 1.1 to 3 times.

Examples of a method for increasing the amount of the particulate hydrous cross-linked polymer to be poured per unit area of fluidized bed include: a method for increasing the pouring amount by providing a drying room of a continuous fluidized-bed dryer with a stepped floor, i.e., by making the bed surface of a rear drying room lower than the bed surface of a front drying room; and a method for forming a plurality of drying rooms by coupling two continuous fluidized-bed dryers and increasing the pouring amount in a second drying room after performing drying in a first drying room. However, the method is not limited to the method that involves use of two apparatuses for the first and second drying rooms, and is not particularly limited as long as there is an increase in the amount of the particulate hydrous cross-linked polymer to be poured per unit area of fluidized bed. In order to prevent the pressure of a blower fan for supplying hot air from becoming too high, it is preferable that the amount of the particulate hydrous cross-linked polymer to be poured per unit area of fluidized bed be such that the height of bed (height of settled bed) with the gas stopped falls within a range of 50 mm to 1000 mm, more preferably 100 mm to 800 mm, or especially preferably 100 mm to 700 mm. In cases where a step is provided between a bed of one drying room and a bed of another, the degree of the step is defined and set so as to fall within a range of 0.01 to 10 times, or more preferably 0.1 to 3 times, of the height of settled bed of the upper drying room.

The dried particulate hydrous cross-linked polymer can be discharged from the last drying room via an upper portion and/or bottom of the fluidized bed. The ratio between the discharge from the upper portion (over-flow extraction) and the discharge from the lower portion (under-flow extraction) is adjusted so that a most recent difference in solid content among the particles of the dried particulate hydrous cross-linked polymer is small. Normally, in cases where the weight-average particle diameter of the dried particulate hydrous cross-linked polymer falls within a range of 1 mm to 5 mm, it is preferable that the ratio (weight ratio) of the discharge from the upper portion fall within a range of 0% to 50%, more preferably 0% to 40%, or still more preferably 0% to 30%. In cases where the weight-average particle diameter is less than 1 mm, it is preferable that the ratio (weight ratio) of the discharge from the upper portion fall within a range of 0% to 30%, or more preferably 0% to 20%. An increase in difference in solid content among the particles presumably causes nonuniformity of surface cross-linked conditions in the subsequent surface cross-linking step, thereby degrading the performance of the resulting water absorbent resin.

The method of the present invention for producing a water absorbent resin may include a fixed-drying-rate period and a falling-drying-rate period. Furthermore, according to the method of the present invention for producing a water absorbent resin, the first drying room may be a fixed-drying-rate period, and the second or subsequent drying room may be a falling-drying-rate period. The term "fixed-drying-rate period" generally means a step subsequent to a material preheating period in drying or, more specifically, a period in which the amount of heat flowing into the material is entirely spent on moisture evaporation with the material temperature held constant. Further, the term "falling-drying-rate period" generally means the last step in drying or, more specifically, a period in which a gradual approximation to equilibrium moisture content is made by spending a part of the heat on moisture evaporation and spending the remaining part of the heat on a rise in temperature of the material. However, in the present invention, the term "fixed-drying-rate period" means a period in which moisture evaporates continuously by certain amounts or larger. Further, in the present invention, the term "falling-drying-rate period" means a period in which the moisture content of the dried material is lower than the critical moisture content. Therefore, the fixed-drying-rate period is observed in an early stage of drying, and the falling-drying-rate period is observed in a later stage of drying. It should be noted here that the "critical moisture content" varies depending on the particle diameter of the material, the structure of the material, the drying temperature, and the like. However, in the present invention, the critical moisture content of the dried material is supposed to be fall within a range of approximately 10 wt % to 20 wt %.

That is, in the present invention, the term "early stage of drying" means a state in which the solid content of the particulate hydrous cross-linked polymer falls within a range of 70 wt % to 90 wt %, e.g., a zone from the inlet to the central portion or the vicinity of the central portion in the direction of movement (length direction) in the fluidized-bed dryer, and the term "later stage of drying" means a state in which the solid content of the particulate hydrous cross-linked polymer falls within a range of 80 wt % to 100 wt %, a zone from the central portion or the vicinity of the central portion to the outlet in the direction of movement (length direction) in the fluidized-bed dryer.

Hot air to be supplied into the fluidized bed may be air circulated with use of part or all of exhaust fumes from inside of the bed, or may be a single path of fresh air heated without being circulated. Further, the direction of hot air in the fluidized-bed dryer is appropriately determined by the condition of a flow. However, the direction is normally from bottom up. For ease of discharge, it is possible to facilitate a continuous flow by blowing hot air in an oblique direction by partially introducing a louvered dish.

The air volume only needs to be adjusted so that the material to be dried does not scatter and is in proper flow conditions. However, in the case of a hydrous cross-linked polymer having an average particle diameter of approximately 0.3 mm to 5 mm, the wind speed of air flow is normally adjusted so as to fall within a range of 0.2 m/s to 5 m/s. Further, the internal pressure of the bed may be higher or lower than atmospheric pressure without problems as long as the system is closed with use of a rotary valve or the like. However, in order to prevent the material from scattering when the system is partially opened, it is preferable that the internal pressure of the bed is negative with respect to atmospheric pressure.

The small amount of fine particles (e.g., particles of less than 150 μm or, in particular, 106 μm in terms of a standard sieve) contained in the particulate hydrous cross-linked polymer is preferably scattered together with exhaust fumes passing though the interior of the fluidized bed, removed from the fluidized bed, and caught by a cyclone and a bag filter. In this case, the fine particles thus caught can be put back into the bed, but it is preferable that the fine particles be removed out of the system and collected separately in another step such as a granulation step. In cases where the fine particles thus caught include a large number of large particles of, for example, not less than 150 μm, it is possible to separately classify the fine particles with use of a classifier to remove only fine particles of less than 150 μm out of the system and put back large particles of not less than 150 μm into the fluidized bed. This makes it possible to reduce the load of the step of classifying the water absorbent resin and reduce the amount of fine powder contained in the final product, thereby improving the performance of the product.

Next, a second preferred embodiment includes an arrangement for "performing pulverization between drying in the first drying room and drying in the second or subsequent room", instead of the arrangement for "performing drying while making the amount of the particulate hydrous cross-linked polymer to be poured per unit area of air-blowing portion in the apparatus larger in a second or subsequent drying room than in a first drying room".

The method for performing pulverization between drying in the first drying room and drying in the second or subsequent room may be, but is not particularly limited to, the after-mentioned method for pulverization.

In the second embodiment, it is preferable that the solid content of the particulate hydrous cross-linked polymer before the pulverization fall within a range of not less than 80 wt % to not more than 90 wt % (with respect to the hydrous cross-linked polymer).

Furthermore, in the second embodiment, it is preferable that the weight-average particle diameter of the particulate hydrous cross-linked polymer before the pulverization fall within a range of not less than 1 mm to not more than 5 mm. Furthermore, according to the method of the present invention for producing a water absorbent resin, it is preferable that the weight-average particle diameter of the particulate hydrous cross-linked polymer after the pulverization be less than 1 mm.

Instead of the arrangement for "performing drying while making the amount of the particulate hydrous cross-linked polymer to be poured per unit area of air-blowing portion in the apparatus larger in a second or subsequent drying room than in a first drying room", a third preferred embodiment includes an arrangement for "performing drying while causing the drying temperature of the second or subsequent drying room to be higher than the drying temperature of the first drying room, with the drying temperature of the first drying room falling within a range of not less than 80° C. to not more than 200° C. and with the drying temperature of the second or subsequent drying room falling within a range of not less than 100° C. to not more than 220° C.". It should be noted here that the difference in temperature between the first drying room and the second or subsequent drying room falls within a range of 1° C. to 200° C., preferably 5° C. to 150° C., or more preferably 10° C. to 100° C.

The term "drying temperature" here means the temperature of a heat medium, e.g., the hot-air temperature of a fluidized bed or the temperature of a heat medium (high-temperature steam or the like) in a heat transfer tube. However, unless otherwise noted, it is preferable that the drying temperature be defined by the hot-air temperature of a fluidized bed. In case of use of a heat transfer tube according to need, its temperature may be identical to or different from the hot-air temperature. Normally, however, it is preferable that the temperatures be identical to each other in a range of ±30° C., preferably ±20° C., or more preferably ±10° C.

Examples of a method for causing the drying temperature of the second drying room to be higher than the drying temperature of the first drying room include, but are not particularly limited to, drying by heating, hot-air drying, drying with use of a heat transfer tube, and drying with use of high-temperature steam.

It is preferable that the drying temperature of the first drying room fall within a range of not less than 80° C. to not more than 200° C., more preferably not less than 90° C. to not more than 200° C., still more preferably not less than 100° C. to not more than 190° C., or still more preferably not less than 100° C. to not more than 180° C. Further, it is preferable that the drying temperature of the second or subsequent drying room fall within a range of not less than 100° C. to not more than 240° C., more preferably not less than 100° C. to not more than 230, more preferably not less than 100° C. to not more than 220° C., more preferably not less than 110° C. to not more than 220° C., still more preferably not less than 120° C. to not more than 210° C., or still more preferably not less than 120° C. to not more than 200° C.

Arrangements other than those described in the second and third preferred embodiments are the same as those described in the first preferred embodiment.

(E) Pulverization and Classification Step

The water absorbent resin particles obtained by drying may be subjected to steps such as pulverization and classification for particle size control as needed for different purposes. These methods are described, for example, in International Publication No. WO 2004/69915 (U.S. Unexamined Patent Application Publication No. 2006/024755).

When the water absorbent resin particles being for use in sanitary materials, it is preferable that the water absorbent particles have a weight-average particle diameter of 100 μm to 1000 μm, more preferably 200 μm to 800 μm, or especially preferably 300 μm to 600 μm.

This step generates fine powder of not more than 150 μm in particle size. The fine powder poses safety and health hazards by degrading the properties of the water absorbent resin. In order to avoid such safety and health hazards, the fine powder is classified for removal. As will be described later, the step of classifying the fine powder for removal may be performed during or after a heat-drying step. The fine powder proceeds through the step of appropriately recovering the fine powder, the step of forming the fine powder into particles again, the step of recovering the particles into a monomer aqueous solution, and the like.

(F) Surface Cross-linking Step

The water absorbent resin particles obtained in the present invention may go through a surface cross-linking step to be processed into a water absorbent resin more suitable for use in sanitary materials. The "surface cross-linking" refers to a condition under which a portion whose cross-linking density is higher is provided on a surface layer (vicinity of a surface:

generally, several dozens μm from the surface) of the water absorbent resin, and can be formed by surface radical crosslinking, surface polymerization, cross-linking reaction with a surface cross-linking agent, or the like.

Further, in the surface cross-linking step of the present invention, it is possible to perform surface crosslinking simultaneously with drying by adding a surface cross-linking agent in any step before continuous fluidized-bed drying, during drying, or after pulverization during drying.

Examples of the surface cross-linking agent that can be used in the present invention include various organic or inorganic cross-linking agents. However, in view of properties and handling, it is preferable to use a cross-linking agent that can be reacted with a carboxyl group. Examples of such a cross-linking agent include a polyhydric alcohol compound, an epoxy compound, a polyhydric amine compound or its condensate with a haloepoxy compound, an oxazoline compound, a mono, di, or polyoxazolidinone compound, a polyhydric metal salt, and an alkylenecarbonate compound.

More specifically, examples of such a cross-linking agent include compounds described in U.S. Pat. Nos. 6,228,930, 6,071,976, 6,254,990, and the like. The specific examples include, but are not particularly limited to: polyhydric alcohol compound such as mono, di, tri, tetra, polyethyleneglycol, monopropyleneglycol, 1,3-propanediol, dipropyleneglycol, 2,3,4-trimethyl-1,3-pentandiol, polypropyleneglycol, glycerin, polyglycerin, 2-butene-1,4-diol, 1,4-butandiol, 1,3-butandiol, 1,5-pentandiol, 1,6-hexanediol, and 1,2-cyclohexanedimethanol; epoxy compounds such as ethyleneglycol diglycidyl ether and glycidol; polyhydric amine compounds such as ethylenediamine, diethylenetriamine, triethylenetetramine, tetraethylenepentamine, pentaethylenehexamine, and polyethyleneimine, and polyamidepolyamine; haloepoxy compounds such as epichlorohydrin, epibromhydrin, and α-methyl epichlorohydrin; a condensate of the polyhydric amine compound and the haloepoxy compound; oxazolidinone compounds such as 2-oxazolidinone; alkylene carbonate compounds such as ethylenecarbonate; oxetane compounds; and cyclic urea compounds such as 2-imidazolidine.

The amount of the surface cross-linking agent to be used varies depending on a compound to be used or a combination of compounds. However, it is preferable that the amount of the surface cross-linking agent to be used fall within a range of 0.001 parts by weight to 10 parts by weight, or more preferably 0.01 parts by weight to 5 parts by weight, with respect to 100 parts by weight (parts by mass) of the water absorbent resin particles. In the present invention, it is possible to use water together with the surface cross-linking agent. In this case, it is preferable that the amount of water to be used fall within a range of 0.5 parts by weight to 20 parts by weight, or more preferably from 0.5 part by weight to 10 parts by weight, with respect to 100 parts by weight of the water absorbent resin particles. Further, in the present invention, it is possible to use a hydrophilic organic solvent as well as water. In this case, it is preferable that the amount of the hydrophilic organic solvent to be used fall within a range of 0 to 10 parts by weight, or more preferably 0 to 5 parts by weight, with respect to 100 parts by weight of the water absorbent resin particles. Further, in mixing a solution of the cross-linking agent with the water absorbent resin particle, it is possible to concomitantly use a water-insoluble microparticle powder or a surfactant within such a range as not to impair the effect of the present invention, e.g., within a range of 0 wt % to not more than 10 wt %, more preferably 0 wt % to 5 wt %, or still more preferably 0 wt % to 1 wt %. A preferred surfactant and a method for using the same are exemplified, for example, in U.S. Pat. No. 7,381,775.

The water absorbent resin with which the surface cross-linking agent has been mixed is preferably treated with heat and then cooled down as needed. The heating temperature preferably falls within a range of 70° C. to 300° C., more preferably 120° C. to 250° C., or still more preferably 150° C. to 250° C. Further, the heating time preferably falls within a range of 1 minute to 120 minutes. The heat treatment can be performed with use of an ordinary dryer or heating furnace.

The addition of the surface cross-linking agent can be performed by various methods. However, it is preferable to use a method for, after mixing the surface cross-linking agent with water and/or a hydrophilic organic solvent in advance, mixing the mixture with the particulate water absorbent resin by spraying or dropping. The spraying method is preferable to the dropping method. In the case of the spraying method, it is preferable that the size of liquid droplets fall within a range of 0.1 μm to 300 μm, or more preferably 0.1 μm to 200 μm, in terms of average particle diameter.

The particulate water absorbent resin, the surface cross-linking agent, and water or a hydrophilic organic solvent are preferably mixed with use of a mixing apparatus having great mixing power to evenly and surely mix the substances. Examples of the mixing apparatus include a cylindrical mixer, a double-walled conical mixer, a high-speed stirring mixer, a V-shaped mixer, a ribbon mixer, a screw mixer, a double-arm kneader, a pulverizing mixer, a rotary mixer, an airflow mixer, a turbulizer, a batch Lödige mixer, and a continuous Lödige mixer.

Further, examples of another mode of surface cross-linking treatment in the present invention include a method for performing surface cross-linking treatment with irradiation of active energy after addition of a processing solvent containing a radically polymerizable compound to the particulate water absorbent resin. Such a method is described, for example, in Japanese Unexamined Patent Application Publication No. 303306/2003 (*Tokugan* 2003-303306) (U.S. Pat. No. 7,201,941). Further, the surface cross-linking treatment can be performed with irradiation of active energy after addition of a surfactant to the processing liquid. Furthermore, examples of another mode of surface cross-linking treatment in the present invention includes a method for performing surface cross-linking treatment by heating after addition of an aqueous solution containing a peroxide radical initiator to the particulate water absorbent resin. Such a method is described, for example, in Japanese Examined Patent Application Publication No. 8883/1995 (*Tokukohei* 7-8883) (U.S. Pat. No. 4,783,510).

(G) Liquid-Permeability Improver

It is preferable that to the particulate water absorbent resin obtained by the method of the present invention for producing a water absorbent resin, a liquid-permeability improver be further added after the surface cross-linking treatment. The addition of the liquid-permeability improver causes the particulate water absorbent resin to have a liquid-permeability improver layer. This causes the particulate water absorbent resin to be further excellent in liquid permeability.

Examples of the liquid-permeability improver include polyamines, polyvalent metal salts, and water-insoluble fine particles. Especially, it is preferable to use a polyvalent metal salt such as aluminum sulfate or, in particular, a water-soluble polyvalent metal salt as the liquid-permeability improver. Techniques applied are described in U.S. Pat. No. 7,179,862, European Patent No. 1165631, U.S. Pat. Nos. 7,157,141, 6,831,142, U.S. Unexamined Patent Application Publication No. 2004/176557, U.S. Unexamined Patent Application Publication No. 2006/204755, U.S. Unexamined Patent Application Publication No. 2006/73969, and U.S. Unexamined Patent Application Publication No. 2007/106013. It should be noted that polyamines and water-insoluble fine particles are exemplified in WO 2006/082188 A1, WO 2006/082189 A1, WO 2006/082197 A1, and the like.

It is preferable that the amount of the liquid-permeability improver to be used fall within a range of 0.001 parts by weight to 5 parts by weight, or more preferably 0.01 parts by weight to 1 part by weight, with respect to 100 parts by weight of the particulate water absorbent resin. If the amount of the liquid-permeability improver used falls within the range, the absorbency against pressure (AAP) and saline flow conductivity (SFC) of the particulate water absorbent resin can be improved.

The addition of the liquid-permeability improver can be performed by a method for, after mixing the liquid-permeability improver with water and/or a hydrophilic organic solvent in advance, mixing the mixture with the particulate water absorbent resin by spraying or dropping. The spraying method is preferable to the dropping method. It should be noted that the addition of the liquid-permeability improver be performed in a step of cooling down the particulate water absorbent resin in a fluidized bed.

(H) Other Steps

In addition to the steps described above, a granulation step, a fine-powder removing step, a fine-powder recycling step, and/or the like may be provided. Examples of such steps include steps described in U.S. Pat. No. 5,264,495, 5,369,148, 5,478,879, 6,228,930, U.S. Unexamined Patent Application Publication No. 2006/247351, International Publication No. WO 2006/101271, and the like.

(I) Other Substances to be Added to the Particulate Water Absorbent Resin

It is possible to add and mix a surface cross-linking agent, a liquid-permeability improver, a lubricant, a chelating agent, a deodorant, an antibacterial agent, water, a surfactant, water-insoluble fine particles, a reducing agent, and the like to and with the particulate water absorbent resin in the order of 0% to 30%, or more preferably 0.01% to 10%, during or after polymerization. In the case of addition and mixture after polymerization, the addition and mixture can be performed before dying, after drying, before pulverization, or after pulverization. Further, it is possible to add other substances to the particulate water absorbent resin, provided such substances do not impair the properties of the particulate water absorbent resin. A method for adding other substances is not particularly limited. According to the present invention, even water absorbent resin compositions each obtained by adding a small amount of additives (e.g., more than 0 to 30 wt %) to a water absorbent resin are referred to collectively as water absorbent resins.

(II) Properties of the Particulate Water Absorbent Resin Obtained by the Method for Producing a Water Absorbent Resin The following explains the weight-average (mass-average) particle diameter (D50), swelling pressure of gel layer (SPGL), pH extractable polymer content, GEX value, saline flow conductivity (SFC), and absorbency against pressure (AAP) of the particulate water absorbent resin obtained by the method of the present invention for producing a water absorbent resin. It should be noted that methods for measuring these properties, respectively, will be described below in Examples.

<Weight-Average Particle Diameter (D50)>

As described in U.S. Pat. No. 5,051,259 and elsewhere, the weight-average particle diameter (D50) is the particle diameter of a standard sieve which has a certain mesh size and corresponds to 50 wt % of the entire particles.

The particulate water absorbent resin was sieved with use of JIS standard sieves (z8801) respectively having mesh sizes of 8000 µm, 5600 µm, 3350 µm, 2800 µm, 2000 µm, 1000 µm, 850 µm, 710 µm, 600 µm, 500 µm, 425 µm, 300 µm, 212 µm, 150 µm, 106 µm, 75 µm, and the like, and the observed value of residual percentage of each particle size was plotted on a logarithmic probability paper. Then, the weight-average particle diameter (D50) is read from a particle diameter corresponding to R=50%.

From a point of view of properties, it is preferable that the final water absorbent resin be controlled so that its weight-average particle diameter falls within a range of 300 µm to 600 µm or more preferably 350 µm to 500 µm and the percentage of particles having a weight-average particle diameter of 850 µm to 150 µm falls within a range of 90 wt % to 100 wt %, more preferably 95 wt % to 100 wt %, or especially preferably 98 wt % to 100 wt %.

<Swelling Pressure of Gel Layer (SPGL)>

The measurement of the swelling pressure of gel layer is the act of measuring the force with which the gel layer held at a constant capacity with respect to the particulate water absorbent resin yet to be subjected to surface crosslinking further swells. The swelling pressure of gel layer indicates the stability of a swollen gel layer.

It is preferable that the particulate water absorbent resin obtained by the method of the present invention for producing a water absorbent resin have a swelling pressure of gel layer (SPGL (B)) of not less than 20 (unit: kdyne/cm$^2$), more preferably not less than 30, or still especially preferably not less than 40. This causes the particulate water absorbent resin to have stability when swollen as a hydrogel polymer.

<Extractable Polymer Content/Amount of Water-Soluble Component>

Extractables refer to water-soluble components contained in the water absorbent resin, and the extractable polymer content indicates the amount of water-soluble component as measured by pH titration. It is preferable that the particulate water absorbent resin obtained by the method of the present invention for producing a water absorbent resin have a extractible polymer content of not more than 18 (wt %), more preferably not more than 15 (wt %), or still more preferably not more than 10 (wt %). Too high an extractable polymer content undesirably prevents the particulate water absorbent resin from absorbing urine when used in disposable diapers and the like.

The term "pH extractable polymer content" here means an extractable polymer content quantified by pH titration.

<GEX Value>

The GEX value is a single parameter that represents, in the relationship between the absorption capacity without pressure (GV/gel volume) and the pH extractable polymer content, a good evaluation in cases where the pH extractable polymer content is low for GV and represents a bad evaluation in cases the pH extractable polymer content is high for GV. The greater GEX value the particulate water absorbent resin has, the higher performance the particulate water absorbent resin gives.

<Saline Flow Conductivity (SFC)>

The saline flow conductivity is a value that indicates the liquid permeability of the swollen particulate water absorbent resin. The greater the value is, the higher the liquid permeability is.

It is preferable that the particulate water absorbent resin obtained by the method of the present invention for producing a water absorbent resin have a saline flow conductivity of not less than 10 (unit: $10^{-7} \cdot cm^3 \cdot s \cdot g^{-1}$), more preferably not less than 20, especially preferably not less than 50, or most preferably not less than 80. This causes the particulate water absorbent resin to be excellent in liquid permeability.

<Absorbency Against Pressure (AAP)>

The absorbency against pressure indicates the absorption capacity of the particulate water absorbent resin under load. It is preferable that the particulate water absorbent resin obtained by the method of the present invention for producing a water absorbent resin have an absorbency against pressure (AAP) of not less than 10 g/g to not more than 28 g/g, more preferably not less than 15 g/g to not more than 27 g/g, or especially preferably not less than 20 g/g to not more than 26 g/g. This causes the particulate water absorbent resin to be excellent in absorbent properties.

<Water Absorbent Resin to be Applied>

The production method of the present invention is suitable in particular to obtain the above water absorbent resin. That is, in comparison with the conventional techniques, the production method of the present invention brings about an improvement in the relationship among the absorption capacity (GV), the absorbency against pressure (AAP), and the liquid permeability (SFC). That is, when a comparison is made with an identical type of property held constant (e.g., with the absorption capacity held constant), the other properties (e.g., SFC and AAP) are favorably improved.

Therefore, the present invention can be applied suitably to production of a water absorbent resin whose absorption capacity (GV) falls within a range of 20 g/g to 100 g/g, preferably 25 g/g to 50 g/g, or more preferably 27 g/g to 45 g/g, whose absorbency against pressure (AAP) preferably falls within a range of not less than 10 g/g to not more than 28 g/g, or whose saline flow conductivity (SFC) is preferably 10 ($10^{-7} \cdot cm^3 \cdot s \cdot g^{-1}$). It is preferable to satisfy two or more, or more preferably all, of the three properties at the same time. It is preferable that the solid content fall within a range of 85% to 99.9%, more preferably 90% to 99.9%, or especially preferably 95% to 99.9%. If the solid content (i.e., 100-moisture content) falls out of the range, there may be deterioration in properties.

(III) Absorbent Core and/or Absorbing Article

The particulate water absorbent resin obtained by the method of the present invention for producing a water absorbent resin is used for the purpose of absorbing water, and is widely used as an absorbent core and an absorbing article. In particular, the particulate water absorbent resin is used as sanitary materials for absorbing body fluids such as urine and blood.

Specifically, a particulate water absorbing agent is produced by performing surface cross-linking treatment with addition of a surface cross-linking agent to the particulate water absorbent resin obtained by the method of the present invention for producing a water absorbent resin, and then adding other substances such as a liquid-permeability improver, a surfactant, and a lubricant. Further, with use of the particulate water absorbing agent, an absorbent core and an absorbing article are produced. It should be noted that a method for adding other substances is not particularly limited.

The term "absorbent core" here means an absorbing agent molded so as to be composed mainly of a particulate water absorbing agent (water absorbent resin) and a hydrophilic fiber. The absorbent core is produced by molding the particulate water absorbing agent and the hydrophilic fiber, for example, into a film, a tube, or a sheet. In the absorbent core, the amount of the particulate water absorbing agent (core concentration) with respect to the total amount of the particulate water absorbing agent and the hydrophilic fiber is preferably 20 wt % to 100 wt %, more preferably 30 wt % to 100 wt %, or still more preferably 40 wt % to 100 wt %. In the absorbent core, the higher core concentration the particulate water absorbing agent has, the more remarkable effect of reducing absorption properties the particulate water absorbing agent exhibits at the time of production of an absorbent core, a disposable diaper, or the like. Further, it is preferable that the absorbent core be so thin as to have a thickness of 0.1 mm to 5 mm.

The absorbing article includes the absorbent core, a liquid permeable front sheet, and a liquid impermeable back sheet. In producing the absorbing article, first, for example, a fiber material and the particulate water absorbing agent are blended or sandwiched so as to produce the absorbent core. Next, the absorbent core is sandwiched between the liquid permeable front sheet and the liquid impermeable back sheet, and is equipped with an elastic member, a diffusion layer, an adhesive tape, and the like as needed, so that the product is used as an absorbing article, particularly, an adult incontinence pad or a sanitary napkin. The absorbent core is compression-molded to a density of 0.06 g/cc to 0.50 g/cc and a basic weight of 0.01 $g/cm^2$ to 0.20 $g/cm^2$. It should be noted that examples of the fiber material that is used include hydrophilic fibers such as crushed wood pulp, a cotton linter, a cross-linked cellulose fiber, rayon, cotton, wool, acetate, and vinylon. Preferably, these fiber materials are aerated.

The absorbing article exhibits excellent absorbent properties. Specific examples of the absorbing article include sanitary materials such as adult disposable diapers that have been remarkably developed in recent years, a children's disposable diaper, sanitary napkins, and so-called incontinence pads. However, the absorbing article is not limited to those materials. The excellent absorbent properties of the particulate water absorbent resin existing in the absorbing article enables the absorbing article to realize a small re-wet amount, a strong feeling of dryness, and a great reduction in burden of the absorbing article on users and their caregivers.

[Embodiment 2]

Another embodiment of the present invention is described below. A typical method for producing a water absorbent resin is described below in sections (1) to (5). A cross-linking method is described in section (7). The "step of further performing second drying on particle-size-controlled water absorbent resin powder" and the "moisture content of a water absorbent resin to be subjected to the surface cross-linking step (5)", which are features of the present invention, are described in section (6) and subsections (6-1) and (6-2). These steps may constitute a batch of steps or a series of steps. However, industrially, it is preferable that these steps be dealt with one after another for continuous production as a whole.

(I) Particulate Water Absorbent Resin (1) Polyacrylate Salt Water Absorbent Resin A water absorbent resin that is obtained by a method of the present invention for producing a water absorbent resin can be widely applied to various polymer structures, but is optimally a polyacrylate salt water absorbent resin, or preferably a water-swelling and water-insoluble cross-linked polymer containing an acrylic acid (salt) at 30 mol % to 100 mol %, more preferably 50 mol % to 100 mol %, still more preferably 70 mol % to 100 mol %, or especially preferably 90 mol % to 100 mol %, out of the recurring units (exclusive of the cross-linking agent). The term "water-swelling" here means that the after-mentioned absorption capacity (GV) is not less than 5 g/g, or more preferably not less than 10 g/g. Further, the term "water-insoluble" here means that the after-mentioned water-soluble component occupies not more than 50%, more preferably not more than 30%, or especially preferably not more than 20%.

An acrylic acid salt or an acrylic acid group serving as a recurring unit of a polymer is neutralized as a monohydric salt, more preferably alkali metal salt or ammonium salt, still more preferably alkali metal salt, or especially preferably sodium salt, within a range of 0 mol % to 100 mol %, more preferably 20 mol % to 100 mol %, still more preferably 50 mol % to 99 mol %, or still more preferably 60 mol % to 90 mol %.

Examples of an unsaturated monomer that can be used include: hydrophilic monomers such as acrylic acid, methacrylic acid, maleic acid (anhydride), fumaric acid, crotonic acid, itaconic acid, vinyl sulfonic acid, 2-(meth)acrylamide-2-methylpropane sulfonic acid, (meth)acryloxyalkane sulfonic acid, N-vinyl-2-pyrrolidone, N-vinylacetamide, (meth)acrylamide, N-isopropyl(meth)acrylamide, N,N-dimethyl(meth)acrylamide, 2-hydroxyethyl(meth)acrylate, methoxypolyethyleneglycol(meth)acrylate, and polyethyleneglycol(meth)acrylate; and salts thereof. Among these monomers, for example, it is possible to appropriately obtain a water absorbent resin from acrylic acid alone, from a combination of acrylic acid and a monomer other than acrylic acid, or from a monomer other than acrylic acid alone.

From the point of view of the properties (absorption capacity, extractable polymer content, residual monomer, liquid permeability, and the like) of the water absorbent resin, it is preferable to use acrylic acid and/or a salt thereof. In the case of use of acrylic acid and/or a salt thereof as an unsaturated monomer, it is most preferable to use acrylic acid (salt) composed of a 1 mol % to 50 mol % acrylic acid and a 50% to 99% alkali metal salt.

Examples of a cross-linking agent that can be used include: compounds, each having at least two polymerizable double bonds in its molecule, such as N,N'-methylenebis(meth)acrylamide, (poly)ethyleneglycol di(meth)acrylate, (poly)propyleneglycol di(meth)acrylate, (polyoxiethylene)trimethylolpropanetri(meth)acrylate, trimethylolpropanedi(meth)acrylate, (poly)ethyleneglycol di(β-acryloyloxipropionate), trimethylolpropane tri(β-acryloyloxipropionate), and poly(meth)allyloxyalkane; and compounds, each capable of forming a covalent bond by reacting with a carboxylic group, such as polyglycidyl ether (ethyleneglycol diglycidyl ether), polyol (ethyleneglycol, polyethyleneglycol, glycerin, sorbitol). These compounds may be used alone or in combination of two or more of them.

In the case of use of a cross-linking agent, it is preferable to essentially use a compound having at least two polymerizable double bonds in its molecule, in consideration of the water absorbent properties and the like of the resulting water absorbent resin. Further, in view of the properties of the cross-linking agent, it is preferable that the cross-linking agent be used in an amount of 0.0001 mol % to 5 mol %, or more preferably 0.005 mol % to 2 mol %, with respect to the above monomer.

These monomers are usually polymerized in an aqueous solution, and the monomer concentration preferably falls within a range of 10 wt % to 90 wt %, more preferably 20 wt % to 80 wt %, still more preferably 30 wt % to 70 wt %, or especially preferably 40 wt % to 60 wt %. Further, the aqueous solution may also contain a surfactant, polyacrylic acid (salt) or a cross-linked polymer thereof (water absorbent resin), starch, a polymer compound such as polyvinyl alcohol, various chelating agents, various additives, and the like at 0 wt % to 30 wt % with respect to the above monomer. The "aqueous solution" in the present application encompasses a dispersion liquid exceeding a saturated concentration, but is preferably polymerized at a saturated concentration or below.

(2) Polymerization Step

The water absorbent resin of the present invention is produced by obtaining a hydrous cross-linked polymer with cross-linking polymerization of the aforementioned unsaturated monomer. From the point of view of performance and ease of control of the polymerization, the polymerization method is usually performed by spraying polymerization, dropping polymerization, aqueous polymerization, or reversed-phase suspension polymerization.

In order to bring more of the effects of the present invention, it is preferable to adopt aqueous polymerization or reversed-phase suspension polymerization, more preferably aqueous polymerization, still more preferably continuous aqueous polymerization, or especially preferably continuous belt polymerization or continuous kneader polymerization. From a point of view of properties and drying efficiency, it is preferable to volatilize at least part of the polymerization solvent by heat of polymerization at the time of polymerization. For example, it is only necessary to raise the solid content by not less than 0.1 wt %, preferably 1 wt % to wt %, more preferably 2 wt % to 30 wt %, especially preferably 3 wt % to 20 wt %, during the polymerization. The rise in solid content is appropriately determined by polymerization temperature (e.g., polymerization at a boiling point), an air current, shape (e.g., the particle diameter of a polymer gel or the thickness of a sheet), and the like.

These polymerizations can be performed in an air atmosphere, but it is preferable that these polymerizations be performed in an atmosphere of an inert gas such as nitrogen and argon (e.g., at an oxygen concentration of not more than 1%). Further, it is preferable that the monomer component be used for polymerization after oxygen dissolved therein is sufficiently substituted by an inert gas to be at an oxygen concentration of less than 1 ppm.

The reversed-phase suspension polymerization is a polymerization method by which a monomer aqueous solution is suspended in a hydrophobic organic solvent. For example, the polymerization method is described in U.S. patents such as U.S. Pat. Nos. 4,093,776, 4,367,323, 4,446,261, 4,683,274, and 5,244,735. The aqueous polymerization is a method by which a monomer aqueous solution is polymerized without using any dispersion solvent. For example, the polymerization method is described in U.S. patents such as U.S. Pat. Nos. 4,625,001, 4,873,299, 4,286,082, 4,973,632, 4,985,518, 5,124,416, 5,250,640, 5,264,495, 5,145,906, 5,380,808, and European patents such as European Patent No. 0811636, European Patent No. 0955086, European Patent No. 0922717, and European Patent No. 1178059. It should be noted that, in performing polymerization, it is possible to use, in the present invention, monomers, cross-linking agents, polymerization initiators, and other additives that are described in these patent documents.

Examples of a polymerization method for aqueous polymerization include a static polymerization method for performing polymerization in a monomer aqueous solution at rest and a stirring polymerization method for performing polymerization in a stirring apparatus. As for the static polymerization method, it is preferable that an endless belt be used. As for the stirring polymerization method, a stirring machine, such as a kneader, which has a plurality of stirring screws is preferably used, although a single-screw stirring machine can be used. More specific examples of the method of the present invention for polymerization include such a method for performing continuous polymerization at a high monomer concentration with use of an endless belt as described in Japanese Unexamined Patent Application Publication No. 307195/2005 (*Tokukai* 2005-307195). Such continuous belt polymerization or continuous kneader polymerization is suitably applied to the present invention, too.

A polymerization initiator for use in the present invention is appropriately selected depending on the mode of polymerization. Examples of such a polymerization initiator include a photolytic polymerization initiator, a pyrolytic polymerization initiator, and a redox polymerization initiator. Examples of the photolytic polymerization initiator include benzoin derivatives, benzyl derivatives, acetophenone derivatives, benzophenone derivatives, and azo compounds. Further, examples of the pyrolytic polymerization initiator include: persulfates such as sodium persulfate, potassium persulfate, and ammonium persulfate; peroxides such as hydrogen peroxide, t-butyl peroxide, and methyl ethyl ketone peroxide; and azo compounds such as azonitrile compounds, azoamidine compounds, cyclic azoamidine compounds, azoamide compounds, alkyl azo compounds, 2,2'-azobis (2-amidinopropane)dihydrochloride, and 2,2'-azobis [2-(2-imidazoline-2-yl)propane]dihydrochloride. Examples of the redox polymerization initiator include a redox polymerization initiator obtained by combining a reducing compound such as L-ascorbic acid or sodium bisulfite with the foregoing persulfate or peroxide.

Further, in the present invention, it is preferable that the photolytic polymerization initiator and the pyrolytic polymerization initiator be used in combination. The polymerization initiator is used in an amount of 0.0001 mol % to 1 mol %, or preferably from 0.001 mol % to 0.5 mol %, with respect to the above monomer.

More specific examples of the method of the present invention for polymerization include such a method for performing continuous polymerization at a high monomer concentration with use of an endless belt as described in Japanese Unexamined Patent Application Publication No. 307195/2005 (*Tokukai* 2005-307195). Continuous belt polymerization and continuous kneader polymerization are preferred because they make it easy to obtain a high-concentration hydrous cross-linked polymer that can be applied suitably to the present invention.

(3) Gel Granulation Step

From a point of view of properties and drying efficiency, it is preferable that the hydrogel polymer before drying be granulated during or after polymerization.

In case of use of aqueous polymerization or, in particular, continuous belt polymerization for polymerization in the present invention, the hydrous cross-linked polymer obtained in the form of a clump, a sheet, or the like the through aqueous polymerization in the polymerization step is dried after being crushed by a crushing apparatus into a particulate hydrous cross-linked polymer. Further, spraying polymerization, dropping polymerization, and reversed-phase suspension polymerization give a particulate hydrous cross-linked polymer by polymerization, and the particulate hydrous cross-linked polymer after polymerization may be dried directly, or may be crushed or granulated as needed for particle size adjustment. It is preferable that the particulate hydrous cross-linked polymer have a weight-average particle diameter falling within a range of 0.5 mm to 10 mm, more preferably 1 mm to 5 mm, still more preferably 1 mm to 3 mm, or especially preferably 1 mm to 2 mm. The weight-average particle diameter is calculated by the after-mentioned measurement (standard sieve classification). If the weight-average particle diameter exceeds 10 mm, it undesirably becomes difficult to fluidize the particulate hydrous cross-linked polymer in a fluidized bed as described below and it undesirably becomes necessary to increase the amount of air to let into the bed.

It should be noted that applicable examples of a method for controlling the weight-average particle diameter within the aforementioned range in the gel granulation step are described in U.S. Pat. Nos. 6,906,159, 5,275,773, 6,100,305, 6,140,395, 6,875,511, U.S. Unexamined Patent Application Publication No. 2004/234607, U.S. Unexamined Patent Application Publication No. 2005/46069, and the like.

(4) Drying Step (First Drying)

The hydrogel polymer, preferably the particulate hydrogel polymer, is dried to be a pulverizable solid. It should be noted here that the hydrophilic cross-linked polymer to be subjected to the drying step takes the form of a hydrogel roughly crushed by a kneader, a meat chopper, a cutter, or the like, an agglomerate thereof, or a hydrogel sheet. The step of crushing (roughly crushing) the agglomerate may be incorporated into the drying step as needed. As such a technique, U.S. Pat. No. 6,187,902 is employed, for example.

It is preferable that the hydrogel thus roughly crushed has a particle size (weight-average particle diameter) of 1 mm to 5 mm. Examples of a drying process method that can be employed include, but are not particularly limited to, various methods such as heat drying, hot-air drying, reduced-pressure drying, infrared drying, microwave drying, dehydration by azeotrope with a hydrophobic organic solvent, and high-humidity drying with high-temperature water vapor, as long as the desired moisture content is attained.

In cases where the hydrophilic cross-linked polymer is dried by hot-air drying, examples of a drying method that is used include a method for drying the hydrophilic cross-linked polymer with the hydrophilic cross-linked polymer being left at rest, a method for drying the hydrophilic cross-linked polymer with the hydrophilic cross-linked polymer being stirred, a method for drying the hydrophilic cross-linked polymer with the hydrophilic cross-linked polymer being shaken, a method for drying the hydrophilic cross-linked polymer with the hydrophilic cross-linked polymer flowing, and a method for drying the hydrophilic cross-linked polymer with airflow. The hydrophilic cross-linked polymer is normally dried within a range of drying temperatures (hot-air temperatures) of 60° C. to 250° C., preferably 100° C. to 220° C., or more preferably 120° C. to 200° C. The drying time is selected so that the desired moisture content is attained, depending on the surface area and moisture content of the polymer and the type of dryer. For example, the drying time may be appropriately selected within a range of 1 minute to 5 hours. This drying causes the solid content of the hydrophilic cross-linked polymer to rise preferably to 70% to 95%, or more preferably to 80% to 95%.

In cases where the solid content is not less than 90%, as compared with cases where the solid content is less than 90%, the solid content is slow in rising in the drying step. In cases where the solid content exceeds 95%, the solid content hardly rises at all. This is considered to be because there is a transition from a fixed-drying-rate period to a falling-drying-rate period at a solid content of 90% to 95%. Therefore, it is not efficient to allow the solid content to exceed 95% in the drying step before the pulverizing step. For such a reason, the conventional surface crosslinking has been performed with a solid content of not more than 95% (i.e., with a moisture content of not less than 5%), as will be mentioned in section (6) and subsection (6-2).

In order to suppress coloring of the water absorbent resin, it is desirable that the atmosphere at the time of drying be low in partial pressure of oxygen, because the water absorbent resin is colored by a reaction that occurs due to the presence of oxygen at the time of heating. It should be noted here that, in order to achieve the present invention, it is preferable that the dry polymer have a moisture content (defined by a loss on drying performed for three hours at 180° C.) of 5 wt % to 15 wt % and it is preferable that the dry polymer has a weight-average particle diameter (defined by sieve classification) of 1 mm to 5 mm, or more preferably 1.5 mm to 4 mm.

(5) Particle Size Control Step

For the purpose of particle size control, the water absorbent resin particles obtained by drying may be pulverized and, as needed, classified. These methods are described, for example, in International Publication No. WO 2004/69915 (U.S. Unexamined Patent Application Publication No. 2006/024755).

When the water absorbent resin particles being for use in sanitary materials, it is preferable that the water absorbent particles have a weight-average particle diameter of 100 μm to 1000 μm, more preferably 200 μm to 800 μm, or especially preferably 300 μm to 600 μm.

This step generates fine powder of not more than 150 μm in particle size. The fine powder poses safety and health hazards by degrading the properties of the water absorbent resin. In order to avoid such safety and health hazards, the fine powder is classified for removal. As will be described later, the step of classifying the fine powder for removal may be performed during or after a heat-drying step. The fine powder proceeds through the step of appropriately recovering the fine powder, the step of forming the fine powder into particles again, the step of recovering the particles into a monomer aqueous solution, and the like.

(6) Heat-Drying Step (Second Drying After Particle Size Control)

In Patent Documents 11 to 41, the water absorbent resin powder thus obtained have been subjected to surface crosslinking. In contrast, with attention focused on the "effects of drying of water absorbent resin powder on surface crosslinking", which has not attracted attention so far, the present invention has been accomplished based on the findings that particular drying and a low moisture content before surface crosslinking greatly affect the outcome of surface crosslinking.

That is, a method of the present invention for producing a water absorbent resin is a method for producing a water absorbent resin, including a sequence of the steps of: (1) polymerizing a monomer aqueous solution; (2) drying a hydrogel polymer obtained in the step (1); (3) performing particle size control by either pulverizing or pulverizing and classifying a dry polymer obtained in the step (2); and (5) performing surface crosslinking on water absorbent resin powder whose particle size has been controlled in the step (3), the method further including the step (4) of performing second heat drying on the water absorbent resin powder whose particle size has been controlled in the step (3), the step (4) preceding the step (5).

The following describes the second heat-drying step (second drying after particle size control).

The present invention performs further heat drying on the particle-size-controlled water absorbent resin after the drying step, the pulverization step, and, as needed, the classification step. As a specific embodiment, the water absorbent resin preferably has a weight-average particle diameter (defined by sieve classification) of 100 μm to 1000 μm, more preferably 200 μm to 800 μm, or especially preferably 300 μm to 600 μm before it is subjected to the heat drying. Further, when an aggregate of particles close in particle size to such a weight-average particle diameter contains water absorbent resin particles whose particle size exceeds 1 mm (as defined by sieve classification), there is likely to be nonuniformity in drying among the particles, because large particles are slow in rising in solid content. Therefore, it is desirable that the content of particles whose particle size exceeds 1 mm be preferably 0 wt % to 20 wt %, more preferably 0 wt % to 10 wt %, or especially preferably 0 wt % to 5 wt %.

Examples of a heat-drying method that can be used in the present invention include drying at rest, drying in a fluidized bed, and drying by stirring. An apparatus for heat drying may be an ordinary dryer of any type that employs a publicly known drying method, such as batch-wise or continuous type or direct heating and/or indirect heating type(s), as long as the dryer can heat the water absorbent resin particles. Examples of the dryer include a belt rest drying dryer, a through-flow vertical dryer, cylindrical stirring dryer, a thin stirring dryer, a rotary dryer, a rotary dryer with a water vapor tube, a through-flow rotary dryer, a fluidized-bed dryer, a conical dryer, a shaking fluidized-bed dryer, and an airflow dryer. Among them, in order to prevent nonuniform drying, it is desirable that the fluidized-bed dryer be used. More preferably, a heat transfer tube is used so that the water absorbent resin particles are efficiently heated. Industrially, it is desirable that a continuous fluidized-bed dryer having a plurality of drying rooms be used. Further, use of the fluidized-bed dryer allows airflow classification. That is, particle size control can be performed by so adjusting the air volume of hot air for use in drying as to blow away microparticles whose particle size is undesirable for products.

In order to suppress coloring of the water absorbent resin, it is desirable that the atmosphere at the time of heat drying be low in partial pressure of oxygen, as in the drying step.

In the present invention, the temperature of heat drying (second drying) is preferably 150° C. to 300° C., more preferably 180° C. to 270° C., or especially preferably 200° C. to 250° C. A lower temperature results in poorer heat efficiency, slower drying speed, and improved properties after surface treatment. The poorer heat efficiency or slower drying speed makes it necessary to use a larger dryer, and the improved properties after surface treatment prevents a desirable change in the water absorbent resin particles. In the present invention, the heat drying time is set so that the moisture content of the water absorbent resin particles is 0% to 3%, 0% to 2.5%, more preferably 0% to 2%, 0% to 1.5%, or especially preferably 0% to 1%. It should be noted that because the lower limit of 0% may require a long time and entail deterioration in the water absorbent resin, the lower limit may be approximately 0.1% or 0.2%. In the present invention, heat drying may be terminated at a point of time where the moisture content becomes not more than 2%. However, in cases where there is nonuniformity in the application of heat due to the drying method or in cases where there is great variation in residence time among the particles in the continuous heat dryer, a water absorbent resin uniform in properties among particles can be obtained by further continuing drying. The heat drying time is preferably not less than 5 minutes to not more than 10 hours, more preferably not less than 10 minutes to not more than 3 hours, or more preferably not less than 15 minutes to not more than 1 hour, albeit depending on the drying method, the drying temperature, and the solid content of the water absorbent resin before drying.

In the step (4) of further performing heat drying on the particle-size-controlled water absorbent resin, it is preferable that the particle-size-controlled water absorbent resin be heated until there is an increase in absorption capacity (GV) per solid content. It is preferable that a temperature and a time be selected so that the increase in GV falls within a range of 1 g/g to 50 g/g, more preferably 2 g/g to 30 g/g, or especially preferably 3 g/g to 20 g/g. The term "per solid content" here is used to express a value that is obtained by correcting an observed value to a value per weight of resin solid content.

For example, in the case of a moisture content of 95%, it is calculated by dividing the observed GV by 0.95.

In the present invention, it is not necessary to use a surface treatment agent such as a surface cross-linking agent in performing heat drying, but it is possible to add additives such as a flow auxiliary substance for the purpose of improving uniformity in heat drying or for the purpose of preventing an increase in fine powder due to process damage.

Since the water absorbent resin particles are at a high temperature after the heat drying, a cooling room may be provided as needed to cool down the water absorbent resin particles. Further, the water absorbent resin particles may be subjected to the classification step after the heat-drying step. This is effective in cases where classification was not performed before the heat-drying step, in cases where process damage to the water absorbent resin particles in the heat-drying step leads to further generation of fine powder.

U.S. Pat. No. 6,187,902 discloses a water absorbent resin production method by which after a particulate hydrogel polymer is dried at rest, an agglomerate portion is roughly pulverized and further dried by agitation or fluidization. Unlike the drying method, the present invention is characterized by such particle size control as described in section (5), not by pulverization of an agglomerate on the order of several millimeters, i.e., performs pulverization or classification before the second drying, thereby controlling particle size for improvement in properties after the surface crosslinking.

Conventionally, in such cases as Patent Documents 40 and 41 where a surface cross-linking agent is added to a preheated water absorbent resin in a heating apparatus and in such cases as Patent Document 38 where surface crosslinking is performed twice, sufficient properties cannot be obtained. In contrast, the present invention achieves dramatic improvement in properties by further including the step (4) of performing second heat drying on the particle-size-controlled water absorbent resin powder before the surface cross-linking step (5).

The present invention requires the undermentioned surface cross-linking step (7) after the step aforementioned step (6) or (6-2). Sufficient improvement in properties cannot be achieved simply by heat treatment in the absence of a surface cross-linking agent as in Patent Document 18 or 19.

(6-2) Second Invention of the Present Invention

Further, a second method of the present invention for producing a water absorbent resin is a method for producing a water absorbent resin, including a sequence of the steps of: (1) polymerizing a monomer aqueous solution; (2) drying a hydrogel polymer obtained in the step (1); (3) performing particle size control by either pulverizing or pulverizing and classifying a dry polymer obtained in the step (2); and (5) performing surface crosslinking on water absorbent resin powder whose particle size has been controlled in the step (3), the water absorbent resin having a moisture content (defined by a loss on drying performed for three hours at 180° C.) of 0 wt % to 3 wt % before it is subjected to the step (5).

As mentioned in section (4), the water absorbent resin retains water intensely; therefore, even the water absorbent resin powder subjected to drying contains water, which serves as a polymerizing solvent, with a moisture content of approximately 5 wt % to 10 wt %. Further drying is very difficult in terms of cost, and there may occur deterioration due to prolonged drying. Therefore, in Patent Documents 11 to 14, surface crosslinking of hydrogel or a water absorbent resin with such a moisture content is directly used for surface crosslinking.

In contrast, based on the findings that a moisture content before surface crosslinking is important, the present invention improves the properties of a water absorbent resin by using a water absorbent resin with a lower moisture content than ever in surface crosslinking. The moisture content control may be performed by adjusting the moisture content by a conventional technique in which a water absorbent resin as it is is dried with no particle size control. However, such a technique generally requires a long period of time. Therefore, it is preferable that heat drying (second drying) be performed after the particle size control.

(6-3) More Preferred Mode of the Heat-Drying Step (Second Drying After Particle Size Control)

The water absorbent resin after heat drying or whose moisture content has been controlled is subjected to surface crosslinking. For further improvement in properties after the surface crosslinking, it is preferable that the water absorbent resin be cooled down or stored as described below.

That is, it is preferable that the water absorbent resin be cooled down after the heat-drying step (4) and then subjected to the surface cross-linking step (5). The water absorbent resin is preferably cooled down to a temperature of not more than 100° C., more preferably 100° C. to 40° C., still more preferably 95° C. to 45° C., or especially preferably 90° C. to 50° C.

Further, it is preferable that the water absorbent resin be stored after the heat-drying step (4) and then subjected to the surface cross-linking step (5). The water absorbent resin is stored for 0.1 minutes to 100 hours on an average, 1 minute to 50 hours on an average more preferably, or 5 minutes to 10 hours on an average especially preferably. More uniform surface crosslinking can be achieved because the storage allows a certain period of maturation.

The cooling and storage are performed because the addition of the undermentioned surface cross-linking agent during heat drying or the addition of the undermentioned surface cross-linking agent immediately after heat drying (at the exist of the dryer) may not result in improved properties. The cooling may be performed by bringing the water absorbent resin into contact with a cold blast or a cooling surface to cool it down forcibly, by adjusting the amount of time during which the water absorbent resin is left unattended after heat drying (after it is taken out from the dryer), or by allowing the water absorbent resin to radiate heat during transportation or storage. Examples of means of storage include various types of hoppers and silos, and examples of means of transportation include pneumatic transportation and conveyer transportation. As the transportation machine and storage machine that are used it is possible to apply those described in U.S. Pat. No. 6,164,455. During the storage or transportation, the apparatus only needs to be kept at the cooling temperature (e.g., 100° C. to 40° C.). Too low a cooling temperature may cause degradation in properties.

(7) Surface Cross-Linking Step

The water absorbent resin finished with the above heat-drying step (6) in the present invention may go through a surface cross-linking step to be processed into a water absorbent resin more suitable for use in sanitary materials. The "surface cross-linking" refers to a condition under which a portion whose cross-linking density is higher is provided on a surface layer (vicinity of a surface: generally, several dozens μm from the surface) of the water absorbent resin, and can be formed by surface radical cross-linking, surface polymerization, cross-linking reaction with a surface cross-linking agent, or the like.

In the present invention, it is possible to apply the surface cross-linking agents (see Patent Documents 18 to 32) and concomitant use thereof (see Patent Document 11), mixing apparatuses therefor (see Patent Documents 12 and 37), auxiliary agents for surface crosslinking (see Patent Documents 33 to 36), heat treatment methods therefor (see Patent Documents 13, 14, and 38 to 41), and the like, as long as the "Second Drying after Particle Size Control" in section (6) or the "moisture content" in subsection (6-2) is observed. Further, surface crosslinking may be performed once or more than once.

Examples of the surface cross-linking agent that can be used in the present invention include various organic or inorganic cross-linking agents. However, in view of properties and handling, it is preferable to use a cross-linking agent that can be reacted with a carboxyl group. Examples of such a cross-linking agent include a polyhydric alcohol compound, an epoxy compound, a polyhydric amine compound or its condensate with a haloepoxy compound, an oxazoline compound, a mono, di, or polyoxazolidinone compound, a polyhydric metal salt, and an alkylenecarbonate compound.

More specifically, examples of such a cross-linking agent include compounds described in U.S. Pat. Nos. 6,228,930, 6,071,976, 6,254,990, and the like. The specific examples include, but are not particularly limited to: polyhydric alcohol compound such as mono, di, tri, tetra, polyethyleneglycol, monopropyleneglycol, 1,3-propanediol, dipropyleneglycol, 2,3,4-trimethyl-1,3-pentandiol, polypropyleneglycol, glycerin, polyglycerin, 2-butene-1,4-diol, 1,4-butandiol, 1,3-butandiol, 1,5-pentandiol, 1,6-hexanediol, and 1,2-cyclohexanedimethanol; epoxy compounds such as ethyleneglycol diglycidyl ether and glycidol; polyhydric amine compounds such as ethylenediamine, diethylenetriamine, triethylenetetramine, tetraethylenepentamine, pentaethylenehexamine, and polyethyleneimine, and polyamidepolyamine; haloepoxy compounds such as epichlorohydrin, epibromhydrin, and α-methyl epichlorohydrin; a condensate of the polyhydric amine compound and the haloepoxy compound; oxazolidinone compounds such as 2-oxazolidinone; alkylene carbonate compounds such as ethylenecarbonate; oxetane compounds; and cyclic urea compounds such as 2-imidazolidine.

The amount of the surface cross-linking agent to be used varies depending on a compound to be used or a combination of compounds. However, it is preferable that the amount of the surface cross-linking agent to be used fall within a range of 0.001 parts by weight to 10 parts by weight, or more preferably 0.01 parts by weight to 5 parts by weight, with respect to 100 parts by weight (parts by mass) of the water absorbent resin particles. In the present invention, it is possible to use water together with the surface cross-linking agent. In this case, it is preferable that the amount of water to be used fall within a range of 0.5 parts by weight to 20 parts by weight, or more preferably from 0.5 part by weight to 10 parts by weight, with respect to 100 parts by weight of the water absorbent resin particles. Further, in the present invention, it is possible to use a hydrophilic organic solvent as well as water. In this case, it is preferable that the amount of the hydrophilic organic solvent to be used fall within a range of 0 to 10 parts by weight, or more preferably 0 to 5 parts by weight, with respect to 100 parts by weight of the water absorbent resin particles. Further, in mixing a solution of the cross-linking agent with the water absorbent resin particle, it is possible to concomitantly use a water-insoluble microparticle powder or a surfactant within such a range as not to impair the effect of the present invention, e.g., within a range of 0 wt % to not more than 10 wt %, more preferably 0 wt % to 5 wt %, or still more preferably 0 wt % to 1 wt %. A preferred surfactant and a method for using the same are exemplified, for example, in U.S. Pat. No. 7,381,775.

The water absorbent resin with which the surface cross-linking agent has been mixed is preferably treated with heat and then cooled down as needed. The heating temperature preferably falls within a range of 70° C. to 300° C., more preferably 120° C. to 250° C., or still more preferably 150° C. to 250° C. Further, the heating time preferably falls within a range of 1 minute to 120 minutes. The heat treatment can be performed with use of an ordinary dryer or heating furnace.

The addition of the surface cross-linking agent can be performed by various methods. However, it is preferable to use a method for, after mixing the surface cross-linking agent with water and/or a hydrophilic organic solvent in advance, mixing the mixture with the particulate water absorbent resin by spraying or dropping. The spraying method is preferable to the dropping method. In the case of the spraying method, it is preferable that the size of liquid droplets fall within a range of 0.1 μm to 300 μm, or more preferably 0.1 μm to 200 μm, in terms of average particle diameter.

The particulate water absorbent resin, the surface cross-linking agent, and water or a hydrophilic organic solvent are preferably mixed with use of a mixing apparatus having great mixing power to evenly and surely mix the substances. Examples of the mixing apparatus include a cylindrical mixer, a double-walled conical mixer, a high-speed stirring mixer, a V-shaped mixer, a ribbon mixer, a screw mixer, a double-arm kneader, a pulverizing mixer, a rotary mixer, an airflow mixer, a turbulizer, a batch Lodige mixer, and a continuous Lodige mixer.

Further, examples of another mode of surface cross-linking treatment in the present invention include a method for performing surface cross-linking treatment with irradiation of active energy after addition of a processing solvent containing a radically polymerizable compound to the particulate water absorbent resin. Such a method is described, for example, in Japanese Unexamined Patent Application Publication No. 303306/2003 (Tokugan 2003-303306) (U.S. Pat. No. 7,201,941). Further, the surface cross-linking treatment can be performed with irradiation of active energy after addition of a surfactant to the processing liquid. Furthermore, examples of another mode of surface cross-linking treatment in the present invention includes a method for performing surface cross-linking treatment by heating after addition of an aqueous solution containing a peroxide radical initiator to the particulate water absorbent resin. Such a method is described, for example, in Japanese Examined Patent Application Publication No. 8883/1995 (Tokukohei 7-8883) (U.S. Pat. No. 4,783,510).

(8) Liquid-Permeability Improver

It is preferable that to the particulate water absorbent resin obtained by the method of the present invention for producing a water absorbent resin, a liquid-permeability improver be further added after the surface cross-linking treatment. The addition of the liquid-permeability improver causes the particulate water absorbent resin to have a liquid-permeability improver layer. This causes the particulate water absorbent resin to be further excellent in liquid permeability.

Examples of the liquid-permeability improver include polyamines, polyvalent metal salts, and water-insoluble fine particles. Especially, it is preferable to use a polyvalent metal salt such as aluminum sulfate or, in particular, a water-soluble polyvalent metal salt as the liquid-permeability improver. Techniques applied are described in U.S. Pat. No. 7,179,862, European Patent No. 1165631, U.S. Pat. Nos. 7,15,7141, 6,831,142, U.S. Unexamined Patent Application Publication No. 2004/176557, U.S. Unexamined Patent Application Publication No. 2006/204755, U.S. Unexamined Patent Application Publication No. 2006/73969, and U.S. Unexamined Patent Application Publication No. 2007/106013. It should be noted that polyamines and water-insoluble fine particles are exemplified in WO 2006/082188 A1, WO 2006/082189 A1, WO 2006/082197 A1, and the like.

It is preferable that the amount of the liquid-permeability improver to be used fall within a range of 0.001 parts by weight to 5 parts by weight, or more preferably 0.01 parts by weight to 1 part by weight, with respect to 100 parts by weight of the particulate water absorbent resin. If the amount of the liquid-permeability improver used falls within the range, the absorbency against pressure (AAP) and saline flow conductivity (SFC) of the particulate water absorbent resin can be improved.

The addition of the liquid-permeability improver can be performed by a method for, after mixing the liquid-permeability improver with water and/or a hydrophilic organic solvent in advance, mixing the mixture with the particulate water absorbent resin by spraying or dropping. The spraying method is preferable to the dropping method. It should be noted that the addition of the liquid-permeability improver be performed in a step of cooling down the particulate water absorbent resin in a fluidized bed.

(9) Other Steps

In addition to the steps described above, a granulation step, a fine-powder removing step, a fine-powder recycling step, and/or the like may be provided. Examples of such steps include steps described in U.S. Pat. Nos. 5,264,495, 5,369,148, 5,478,879, 6,228,930, U.S. Unexamined Patent Application Publication No. 2006/247351, International Publication No. WO 2006/101271, and the like.

(10) Other Substances to be Added to the Particulate Water Absorbent Resin

It is possible to add and mix a surface cross-linking agent, a liquid-permeability improver, a lubricant, a chelating agent, a deodorant, an antibacterial agent, water, a surfactant, water-insoluble fine particles, a reducing agent, and the like to and with the particulate water absorbent resin in the order of 0% to 30%, or more preferably 0.01% to 10%, during or after polymerization. In the case of addition and mixture after polymerization, the addition and mixture can be performed before dying, after drying, before pulverization, or after pulverization. Further, it is possible to add other substances to the particulate water absorbent resin, provided such substances do not impair the properties of the particulate water absorbent resin. A method for adding other substances is not particularly limited. According to the present invention, even water absorbent resin compositions each obtained by adding a small amount of additives (e.g., more than 0 to 30 wt %) to a water absorbent resin are referred to collectively as water absorbent resins.

(II) Properties of the Particulate Water Absorbent Resin Obtained by the Method for Producing a Water Absorbent Resin The following explains the weight-average (mass-average) particle diameter (D50), saline flow conductivity (SFC), and absorbency against pressure (AAP) of the particulate water absorbent resin obtained by the method of the present invention for producing a water absorbent resin. It should be noted that methods for measuring these properties, respectively, will be described below in Examples.

<Weight-Average Particle Diameter (D50)>

As described in U.S. Pat. No. 5,051,259 and elsewhere, the weight-average particle diameter (D50) is the particle diameter of a standard sieve which has a certain mesh size and corresponds to 50 wt % of the entire particles.

The particulate water absorbent resin was sieved with use of JIS standard sieves (z8801) respectively having mesh sizes of 8000 μm, 5600 μm, 3350 μm, 2800 μm, 2000 μm, 1000 μm, 850 μm, 710 μm, 600 μm, 500 μm, 425 μm, 300 μm, 212 μm, 150 μm, 106 μm, 75 μm, and the like, and the residual percentage of each particle size was plotted on a logarithmic probability paper. Then, the weight-average particle diameter (D50) is read from a particle diameter corresponding to R=50%.

From a point of view of properties, it is preferable that the final water absorbent resin be controlled so that its weight-average particle diameter falls within a range of 300 μm to 600 μm or more preferably 350 μm to 500 μm and the percentage of particles having a weight-average particle diameter of 850 μm to 150 μm falls within a range of 90 wt % to 100 wt %, more preferably 95 wt % to 100 wt %, or especially preferably 98 wt % to 100 wt %.

<Saline Flow Conductivity (SFC)>

The saline flow conductivity is a value that indicates the liquid permeability of the swollen particulate water absorbent resin. The greater the value is, the higher the liquid permeability is.

It is preferable that the particulate water absorbent resin obtained by the method of the present invention for producing a water absorbent resin have a saline flow conductivity of not less than 10 (unit: $10^{-7} \cdot cm^3 \cdot s \cdot g^{-1}$), more preferably not less than 20, especially preferably not less than 50, or most preferably not less than 80. This causes the particulate water absorbent resin to be excellent in liquid permeability.

<Absorbency Against Pressure (AAP)>

The absorbency against pressure indicates the absorption capacity of the particulate water absorbent resin under load. It is preferable that the particulate water absorbent resin obtained by the method of the present invention for producing a water absorbent resin have an absorbency against pressure (AAP) of not less than 10 g/g to not more than 28 g/g, more preferably not less than 15 g/g to not more than 27 g/g, or especially preferably not less than 20 g/g to not more than 26 g/g. This causes the particulate water absorbent resin to be excellent in absorbent properties.

<Water Absorbent Resin to be Applied>

The production method of the present invention is suitable in particular to obtain the above water absorbent resin. That is, in comparison with the conventional techniques, the production method of the present invention brings about an improvement in the relationship among the absorption capacity (GV), the absorbency against pressure (AAP), and the liquid permeability (SFC). That is, when a comparison is made with an identical type of property held constant (e.g., with the absorption capacity held constant), the other properties (e.g., SFC and AAP) are favorably improved.

Therefore, the present invention can be applied suitably to production of a water absorbent resin whose absorption capacity (GV) falls within a range of 20 g/g to 100 g/g, preferably 25 g/g to 50 g/g, or more preferably 27 g/g to 45 g/g, whose absorbency against pressure (AAP) preferably falls within a range of not less than 10 g/g to not more than 28 g/g, or whose saline flow conductivity (SFC) is preferably 10 ($10^{-7} \cdot cm^3 \cdot s \cdot g^{-1}$). It is preferable to satisfy two or more, or more preferably all, of the three properties at the same time. It is preferable that the solid content fall within a range of 85% to 99.9%, more preferably 90% to 99.9%, or especially preferably 95% to 99.9%. If the solid content (i.e., 100-moisture content) falls out of the range, there may be deterioration in properties.

(III) Absorbent Core and/or Absorbing Article

The particulate water absorbent resin obtained by the method of the present invention for producing a water absorbent resin is used for the purpose of absorbing water, and is widely used as an absorbent core and an absorbing article. In particular, the particulate water absorbent resin is used as sanitary materials for absorbing body fluids such as urine and blood.

Specifically, a particulate water absorbing agent is produced by performing surface cross-linking treatment with addition of a surface cross-linking agent to the particulate water absorbent resin obtained by the method of the present invention for producing a water absorbent resin, and then adding other substances such as a liquid-permeability improver, a surfactant, and a lubricant. Further, with use of the particulate water absorbing agent, an absorbent core and an absorbing article are produced. It should be noted that a method for adding other substances is not particularly limited.

The term "absorbent core" here means an absorbing agent molded so as to be composed mainly of a particulate water absorbing agent (water absorbent resin) and a hydrophilic fiber. The absorbent core is produced by molding the particulate water absorbing agent and the hydrophilic fiber, for example, into a film, a tube, or a sheet. In the absorbent core, the amount of the particulate water absorbing agent (core concentration) with respect to the total amount of the particulate water absorbing agent and the hydrophilic fiber is preferably 20 wt % to 100 wt %, more preferably 30 wt % to 100 wt %, or still more preferably 40 wt % to 100 wt %. In the absorbent core, the higher core concentration the particulate water absorbing agent has, the more remarkable effect of reducing absorption properties the particulate water absorbing agent exhibits at the time of production of an absorbent core, a disposable diaper, or the like. Further, it is preferable that the absorbent core be so thin as to have a thickness of 0.1 mm to 5 mm.

The absorbing article includes the absorbent core, a liquid permeable front sheet, and a liquid impermeable back sheet. In producing the absorbing article, first, for example, a fiber material and the particulate water absorbing agent are blended or sandwiched so as to produce the absorbent core. Next, the absorbent core is sandwiched between the liquid permeable front sheet and the liquid impermeable back sheet, and is equipped with an elastic member, a diffusion layer, an adhesive tape, and the like as needed, so that the product is used as an absorbing article, particularly, an adult incontinence pad or a sanitary napkin. The absorbent core is compression-molded to a density of 0.06 g/cc to 0.50 g/cc and a basic weight of 0.01 g/cm$^2$ to 0.20 g/cm$^2$. It should be noted that examples of the fiber material that is used include hydrophilic fibers such as crushed wood pulp, a cotton linter, a cross-linked cellulose fiber, rayon, cotton, wool, acetate, and vinylon. Preferably, these fiber materials are aerated.

The absorbing article exhibits excellent absorbent properties. Specific examples of the absorbing article include sanitary materials such as adult disposable diapers that have been remarkably developed in recent years, a children's disposable diaper, sanitary napkins, and so-called incontinence pads. However, the absorbing article is not limited to those materials. The excellent absorbent properties of the particulate water absorbent resin existing in the absorbing article enables the absorbing article to realize a small re-wet amount, a strong feeling of dryness, and a great reduction in burden of the absorbing article on users and their caregivers.

Examples

In the following, the present invention will be described more specifically by way of an Example of Production, Examples, and Comparative Examples. However, the present invention is not limited to these Examples. An example based on a proper combination of technical means disclosed in different examples is encompassed in the technical scope of the present invention.

All the electrical apparatuses for use in Examples operated at 200 V or 100 V unless otherwise specified. Furthermore, the water absorbent resin was used at 25±2° C. and at 50% RH unless otherwise specified. The following measuring methods and the reagents and apparatuses exemplified in Examples and Comparative Examples may be appropriately substituted by equivalents.

[Methods for Measuring the Properties]

<Swelling Pressure of Gel Layer (SPGL)>

The swelling pressure of a gel layer was measured in the following manner with use of a digital force gage (marketed as "Accuforce Cadnet Force Gage X5931C"; manufactured by AMETEK Co.). A particulate water absorbent resin (a) classified into 300 μm to 500 μm was poured in an amount of 0.358 g into a cell (b) for use in FISHER ELECTRO-PHOTOMETER. Into the cell (b), 10 g of synthetic urine (c) whose temperature had been adjusted to 25° C. were poured. It should be noted here that the synthetic urine (c) used had been prepared by mixing 0.25 g of calcium chloride dihydrate, 2.0 g of potassium chloride, 0.50 g of magnesium chloride hexahydrate, 2.0 g of sodium sulfate, 0.85 g of ammonium dihydrogen phosphate, 0.15 g of ammonium dihydrogen phosphate, and 994.25 g of pure water. Immediately after that, a drop lid (d) made of polyethylene was placed deep inside the cell (b), and an up-and-down lever and an adjust knob were used to make such an adjustment that a load-measuring shaft (e) having a circular plate having a diameter of 20 mm overlapped the drop lid (d). Next, 10g of the synthetic urine (c) were further added. After the gel layer of the swollen particulate water absorbent resin reached the drop lid (d), a 30-minute-long measurement was performed. As a Force Gage measured value (g) for use in calculation of SPGL, the maximum value observed during the 30-minute-long measurement was adopted. Then, SPGL(A) (kdyne/cm$^2$) was calculated according to Formula (1):

$$SPGL(A) \text{ (kdyne/cm}^2\text{)} = \text{Force Gage measured value (g)} \times 981 \text{ (cm·s}^{-2}\text{)}/3.14 \text{ (cm}^2\text{)}/1000 \quad \text{Formula (1)}$$

It should be noted here that the value of SPGL(A) is obtained by converting the Force Gage measured value (g) into force per unit area according to Formula (1).

The value of SPGL(A) depends greatly on the value of the centrifuge retention capacity saline (CRCs) (g/g) of the particulate water absorbent resin with respect to 0.9 wt % saline. Therefore, if the CRCs of the particulate water absorbent resin to be measured is different, it is impossible to easily judge the quality of the particulate water absorbent resin with use of the value of SPGL(A). Accordingly, SPGL is calculated at identical CRCs with use of a relational expression (approximate expression) between CRCs and SPGL(A). SPGL(B) (kdyne/cm$^2$), which is a value obtained by conversion at CRCs=40 (g/g), was calculated according to Formula (2):

$$SPGL(B) \text{ (kdyne/cm}^2\text{)} = 201.35 \times e^{([ln(SPGL(A)/201.35)]/CRCs \times 40)} \quad \text{Formula (2)}$$

where ln(SPGL(A)/201.35) is the natural logarithm of (SPGL(A)/201.35).

<Extractable Polymer Content>

A 0.90 wt % sodium chloride aqueous solution was poured in a measured amount of 184.3 g into a 250 ml plastic container having a cover. Into the solution, 1.00 g of the particulate water absorbent resin was added, and the solution was stirred for 16 hours by rotating a Teflon (registered trademark) magnetic stirrer (having a length of 250 mm and a diameter of 8 mm) at approximately 500 rpm, so that extractables were extracted from the particulate water absorbent resin. The extract solution was filtered through a piece of filter paper (marketed as "JIS P3801 No. 2"; manufactured by ADVANTEC Toyo Kaisha, Ltd.; thickness: 0.26 mm; diameter of retained particles: 5 μm), so that a filtrate was obtained. The filtrate was measured out in an amount of 50.0 g, and that 50.0 g of the filtrate was used as a measurement solution.

First, only the 0.9 wt % saline was titrated with use of a 0.1N NaOH aqueous solution until a pH of 10. Thereafter, the blank titers ([bNaOH]ml and [bHCl]ml) were obtained by titrating the 0.9 wt % saline with use of a 0.1N HCl aqueous solution until a pH of 2.7. The titers ([NaOH]ml and [HCl]ml) were calculated by performing the same operation on the measurement solution.

Then, on the basis of the monomeric weight-average molecular weight of the particulate water absorbent resin and the titers obtained by the operation, the pH extractable polymer content (wt %) and neutralization ratio (mol %) of the particulate water absorbent resin can be calculated according to Formulas (3) and (4), respectively.

pH extractable polymer content (wt %)=0.1×(weight-average molecular weight)×184.3×100×([HCl]−[bHCl])/1000/1.0/ 50.0     Formula (3)

Neutralization ratio (mol %)=(1−([NaOH]−[bNaOH])/([HCl]−[bHCl]))×100     Formula (4)

<Absorption Capacity without Pressure (GV)>

The particulate water absorbent resin was evenly poured in an amount of 0.2 g into a bag (60 mm×60 mm, Heatlon Paper GS-22 manufactured by Nangoku Pulp Industry Co., Ltd.) made of a nonwoven fabric. After heat sealing, the bag was immersed in 100 g of a 0.9 wt % sodium chloride aqueous solution (physiological saline). The bag was withdrawn 30 minutes later, and then drained with use of a centrifugal separator for 3 minutes at 250×9.81 m/s² (250G). Thereafter, the weight $W_1$ (g) of the bag was measured. Further, the same operation was performed without use of the particulate water absorbent resin, and the weight $W_0$ (g) was measured then. Then, from the weights $W_1$ and $W_0$, the GV (absorption capacity without pressure) was calculated according to Formula (5):

$GV$ (g/g)=(($W_1$−$W_0$)/mass of particulate water absorbent resin)−1     Formula (5)

Note, however, that the measurement of GV of the particulate water absorbent resin before the heat-drying step was performed according to the aforementioned method except that a solid content of 0.2 g was used and a correction in solid content was made at the time of GV calculation.

<GEX Value>

In cases where the pH extractable polymer content is x (wt %) and the GV is y (g/g), the GEX value of defined according to Formula (6):

GEX value=($y$−15)/$ln(x)$     Formula (6)

where ln(x) is the natural logarithm of x.

<Saline Flow Conductivity (SFC)>

The saline flow conductivity (SFC) was measured in conformity to the saline flow conductivity test described in U.S. Unexamined Patent Application Publication No. 2004/0106745 and Japanese Translation of PCT Patent Application Publication No. 509591/1997 (Tokuhyohei 9-509591).

Specifically, 0.90 g of the particulate water absorbent resin were evenly poured into a cell, and the particulate water absorbent resin was swollen for 60 minutes in synthetic urine under a pressure of 0.3 psi (2.07 kPa). In so doing, the height of the gel layer was recorded. Next, under a pressure of 0.3 psi (2.07 kPa), a 0.69 wt % sodium chloride aqueous solution was supplied from a tank at a constant hydrostatic pressure to permeate the swollen gel layer.

The tank had a glass tube inserted thereinto. The glass tube was disposed with its lower end positioned so that the level of a 0.69 wt % sodium chloride aqueous solution in the cell was 5 cm higher than the bottom of the swollen gel. The 0.69 wt % sodium chloride aqueous solution in the tank was supplied to the cell via an L-shaped tube with a cock. Disposed under the cell was a collecting container, placed on an even balance, which was used for collecting liquid having passed through the gel layer. The collecting container had an inside diameter of 6 cm, and had a lower bottom surface provided with a No. 400 mesh metal gauze (having a mesh size of 38 μm). A piston had a lower portion provided with a hole sufficient for the liquid to pass through, and had a bottom provided with a glass filter having such a high permeability that the particulate water absorbent resin or the swollen gel thereof did not crawl into the hole. The cell was placed on a table on which to place a cell, and the table was placed on the stainless metal gauze so that the liquid was prevented from passing through.

The synthesized urine was prepared by mixing 0.25 g of calcium chloride dihydrate, 2.0 g of potassium chloride, 0.50 g of magnesium chloride hexahydrate, 2.0 g of sodium sulfate, 0.85 g of ammonium dihydrogen phosphate, 0.15 g of ammonium dihydrogen phosphate, and 994.25 g of pure water.

It should be noted that the SFC test was conducted at room temperature (20° C. to 25° C.). The amount of liquid passing through the gel layer was recorded for 10 minutes at intervals of 20 seconds as a function of time with use of a computer and a balance. The flow rate Fs(t) of the liquid passing through the swollen gel (mainly between particles thereof) was determined in units of g/s by dividing the increased weight (g) by the increased time (s). The value of Fs (t=0), i.e., the first flow rate of the liquid passing through the gel layer was calculated with use of the flow rates obtained during the 10-minute interval after "ts", i.e., after the time at which a constant hydrostatic pressure and a stable flow rate had been obtained. Fs (t=0) was calculated by extrapolating the least square of Fs (t) against time into t=0. Then, the saline flow conductivity SFC (rate of liquid permeability against pressure) was calculated according to Formula (7). It is should be noted that the unit of the rate of liquid permeability against pressure is ($10^{-7}·cm^3×s×g^{-1}$).

Rate of liquid permeability against pressure ($10^{-7}·cm^3×s×g^{-1}$)=$Fs(t=0)×L_0/(ρ×A×ΔP)$     Formula (7)

Fs (t=0): Flow rate in "g/s"

$L_0$: Height of the gel layer in "cm"

ρ: Density (1.003 g/cm³) of NaCl solution

A: Area (28.27 cm²) on an upper side of the gel layer in the cell

ΔP: Hydrostatic pressure (4920 dyne/cm²) exerted on the gel layer

<Absorbency Against Pressure (AAP)>

A load was prepared so as to achieve a pressure of 4.83 kPa (0.70 Psi). Then, 0.90 g of the particulate water absorbent resin were evenly spread onto a 400 mesh metal gauze (having a mesh size of 38 μm) attached to the bottom of a plastic cylinder having a diameter of 60 mm. The load was mounted on the particulate water absorbent resin, and the mass $W_2$ (g) of the set of measuring apparatuses was measured.

Next, a glass filter (manufactured by Sogo Laboratory Glass Works Co., Ltd.; having a fine pores diameter of 100 μm to 120 μm) having a diameter of 90 mm was placed into a petri dish having a diameter of 150 mm. Thereafter, a 0.90 wt % sodium chloride aqueous solution (20° C. to 25° C.) was added until it was at the same level as an upper surface of the glass filter.

Then, a piece of filter paper (marketed as "JIS P3801 No. 2"; manufactured by ADVANTEC Toyo Kaisha, Ltd.; thickness: 0.26 mm; diameter of retained particles: 5 μm) having a diameter of 90 mm was placed thereon so that a surface of the filter paper was entirely wetted, and an excess of liquid was removed.

The set of measuring apparatuses was placed on the wet filter paper, and then the particulate water absorbent resin was allowed to absorb the liquid under the load. One hour later, the set of measuring apparatuses was lifted, and the mass $W_3$ (g) thereof was measured. From the masses $W_2$ and $W_3$, the absorbency against pressure (g/g) was calculated according to Formula (8):

$$\text{Absorbency against pressure (g/g)} = (W_3 - W_2)/\text{mass of particulate water absorbent resin (g)} \quad \text{Formula (8)}$$

It should be noted that the reason for the use of the absorbency against pressure under a pressure of 4.83 kPa (0.7 Psi) (under load) is that it is assumed that absorbent cores or absorbing articles such as disposable diapers are used by infants who are sleeping or sitting.

<Moisture Content>

One gram of hydrogel or water absorbent resin was thinly spread onto a 6 cm aluminum dish and dried at 180° C. in a windless oven for 3 hours, whereby the loss on drying (wt %) of the hydrogel or water absorbent resin was measured to serve as the moisture content. Note that the solid content (%) is defined by (100-moisture content) (%).

[Example of Production 1]

A 48.5 wt % sodium hydroxide aqueous solution, an acrylic acid, a mixed solution of a 30 wt % polyethylene glycol diacrylate (average molecular weight 523) aqueous solution (flow rate 0.0513 g/sec) and a 46 wt % diethylenetriamine pentaacetic acid trisodium aqueous solution (flow rate 0.0016 g/sec), and water were continuously supplied to a mixer at flow rates of 9.7 g/sec, 12.1 g/sec, 0.0529 g/sec, and 5.286 g/sec, respectively. Thus prepared was a monomer aqueous solution having a temperature of 103° C.

To the monomer aqueous solution thus prepared, a 1.0 wt % sodium persulfate aqueous solution was further added at a flow rate of 0.589 g/sec. After that, the monomer aqueous solution was continuously supplied onto an endless belt, kept at a temperature of approximately 100° C., which was running at a speed of 230 cm/min. The monomer aqueous solution continuously supplied onto the belt started immediately to polymerize. Thus obtained was a band-like hydrogel sheet.

The hydrogel sheet was continuously roughly crushed (segmentalized) with use of a cutter mill (marketed as "U-280"; manufactured by HORAI) having a screen having a diameter of 8 mm. Thus obtained was a particulate hydrous cross-linked polymer (b) having a temperature of approximately 35° C. and a size of approximately 2 mm to 5 mm. At this time, the particulate hydrous cross-linked polymer (b) had a moisture content of 29 wt %.

Example 1

The particulate hydrous cross-linked polymer (b) was continuously poured at 74 kg/h into a conduction flow dryer (marketed as "FCA-2"; manufactured by OKAWARA MFG. CO., LTD., fluidized-bed length 850 mm / fluidized-bed width 240 mm=3.54) set to a hot-air temperature of 180° C. and a wind speed of 2.4 m/sec. It should be noted that the interior of the fluidized bed was divided into four rooms by three partition plates placed at substantially regular intervals in the length direction. The height of the fluidized bed during drying was approximately 300 mm. A dry polymer (A1) discharged from the dryer through an outlet when the internal temperature of the bed was stabilized 60 minutes after the start of drying was sampled. The moisture content of the sample was measured to be 8.5 wt %.

Comparative Example 1

Drying was continuously performed under the same conditions as in Example 1 except that the fluidized bed served as a single room without use of a partition plate. Also in Comparative Example 1, the height of the fluidized bed during drying was approximately 300 mm, and a dry polymer (B1) discharged from the dryer through an outlet when the internal temperature of the bed was stabilized 60 minutes after the start of drying was sampled. The moisture content of the sample was measured to be 9.6 wt %.

Example 2

The particulate hydrous cross-linked polymer (b) was poured in an amount of 14.0 kg into a conduction flow dryer (marketed as "FCA-2"; manufactured by OKAWARA MFG. CO., LTD., fluidized-bed length 850 mm/fluidized-bed width 240 mm=3.54) set in advance to a hot-air temperature of 200° C. and a wind speed of 2.4 m/sec, and then dried for 10 minutes. Thus obtained was a dry polymer (first drying). This operation was performed five times. Thus obtained were 55 kg of a dry polymer (A2) having a moisture content of 8.6 wt %.

Subsequently, a dry polymer (A2) was poured in an amount of 21.5 kg into the conduction flow dryer set in advance to a hot-air temperature of 200° C. and a wind speed of 2.4 m/sec (second drying), and then dried for 23 minutes. Thus obtained was a dry polymer (B2) having a moisture content of 4.0 wt %.

<Calculation of the Amount of Moisture Evaporation Per Unit Time During the Second Drying>

Amount of Water Contained in 21.5 kg of Dry Polymer (A2): 21.5×0.086=1.849 kg

Amount of Water Contained in Dry Polymer (B2): 0.819 kg

Amount of Moisture Evaporation (Amount of Water Reduced): 1.849−0.819=1.03 kg

Amount of Moisture Evaporation (Amount of Water Reduced) per Unit Time: 1.03/23=0.0448 kg/min Comparative Example 2

A dry polymer (A2) was obtained in the same manner as in Example 2 (first drying). Subsequently, the dry polymer (A2) was poured in an amount of 14.0 kg into a conduction flow dryer set in advance to a hot-air temperature of 200° C. and a wind speed of 2.4 m/sec (second drying), and then dried for 21 minutes (second drying). Thus obtained was a dry polymer (C2) having a moisture content of 4.0 wt %.

<Calculation of the Amount of Moisture Evaporation (Amount of Water Reduced) per Unit Time during the Second Drying>

Amount of Water Contained in 14.0 kg of Dry Polymer (A2): 1.204 kg

Amount of Water Contained in Dry Polymer (C2): 0.533 kg

Amount of Moisture Evaporation (Amount of Water Reduced): 1.204−0.533=0.671 kg

Amount of Moisture Evaporation (Amount of Water Reduced) per Unit Time: 0.671/21=0.0320 kg/min

Example 3

A dry polymer (A2) was obtained in the same manner as in Example 2 (first drying). Subsequently, the dry polymer (A2) was poured in an amount of 21.5 kg into a conduction flow dryer (marketed as "FCA-2"; manufactured by OKAWARA MFG. CO., LTD., fluidized-bed length 850 mm/fluidized-bed width 240 mm=3.54, surface area of heat transfer tube/area of air-blowing portion of fluidized bed=4.1), set in advance to a hot-air temperature of 200° C. and a wind speed of 2.4 m/sec, whose heat transfer tube had been set to a temperature of 200° C., and then dried for 25 minutes (second drying). Thus obtained was a dry polymer (B3) having a moisture content of 2.7 wt %.

<Calculation of the Amount of Moisture Evaporation Per Unit Time During the Second Drying>

Amount of Water Contained in 21.5 kg of Dry Polymer (A2): 1.849 kg

Amount of Water Contained in Dry Polymer (B3): 0.545 kg

Amount of Moisture Evaporation (Amount of Water Reduced): 1.849−0.545=1.304 kg

Amount of Moisture Evaporation (Amount of Water Reduced) per Unit Time: 1.304/25=0.0522 kg/min

Example 4

The particulate hydrous cross-linked polymer (b) was poured in an amount of 21.5 kg into a conduction flow dryer set in advance to a hot-air temperature of 180° C., a wind speed of 2.4 m/sec, and a heat-transfer-tube temperature of 180° C., and then dried for 11 minutes. Thus obtained was a dry polymer (first drying). This operation was performed for five times. Thus obtained were 90 kg of a dry polymer (A4) having a moisture content of 10.0 wt %. The weight-average particle diameter of the dry polymer (A4) was 2.4 mm.

Subsequently, the dry polymer (A4) was pulverized with use of a roll granulator (having a clearance of 10 mm/5 mm). Thus obtained was a particulate pulverized polymer (B4) having a weight-average particle diameter of 410 μm.

Next, the particulate pulverized polymer (B4) thus obtained was poured in an amount of 20.0 kg into a conduction flow dryer set in advance to a hot-air temperature of 180° C. and a wind speed of 0.5 m/sec, and then dried for 40 minutes (second drying). Thus obtained was a dry polymer (C4) having a moisture content of 4.3 wt %.

<Calculation of the Amount of Moisture Evaporation Per Unit Time During the Second Drying>

Amount of Water Contained in 20.0 kg of Dry Polymer (B4): 2.000 kg

Amount of Water Contained in Dry Polymer (C4): 0.809 kg

Amount of Moisture Evaporation (Amount of Water Reduced): 2.000−0.809=1.191 kg

Amount of Moisture Evaporation (Amount of Water Reduced) per Unit Time: 1.191/40=0.0298 kg/min

Comparative Example 3

A dry polymer (A4) was obtained through the same operation as in Example 4 (first drying).

Subsequently, the dry polymer (A4) was poured in an amount of 14.0 kg into a conduction flow dryer set in advance to a hot-air temperature of 180° C. and a wind speed of 2.4 m/sec, and then dried for 40 minutes. Thus obtained was a coarse-grained dry polymer (D4) having a moisture content of 3.6 wt % (second drying).

<Calculation of the Amount of Moisture Evaporation Per Unit Time During the Second Drying>

Amount of Water Contained in 14.0 kg of Dry Polymer (A4): 1.400 kg

Amount of Water Contained in Dry Polymer (D4): 0.471 kg

Amount of Moisture Evaporation (Amount of Water Reduced): 1.400−0.471=0.929 kg

Amount of Moisture Evaporation (Amount of Water Reduced) per Unit Time: 0.929/40=0.0232 kg/min

Example 5

The pulverized dry polymer (C4) obtained in Example 4 was classified with use of sieves respectively having a mesh size of 850 μm and a mesh size of 150 μm. Thus obtained were particles, having a weight-average particle diameter of 414 μm, most of which had a particle diameter of 150 μm to 850 μm. To and with 400 g of the particles thus classified, 14.04 g of an surface-cross-linking-agent-containing aqueous solution composed of 1,4-butanediol, propylene glycol, and water at a ratio of 0.34:0.56:3.0 were sprayed and mixed with use of a Lodige mixer. Thereafter, the mixture was treated with heat for 40 minutes with use of a mortar mixer set in advance to an oil-bath temperature of 205° C. After the heat treatment, the product was classified with use of a sieve having a mesh size of 850 μm. Thus obtained was a surface-treated polymer (E3).

Then, 35 g of the surface-treated polymer (E3) and 10 g of glass beads were put into a mayonnaise jar having a capacity of 225 ml, and then shaken for 30 minutes by a paint shaker. Next, to and with 30 g of the powder thus shaken, 0.36 g of a liquid-permeability improver composed of 50% aluminum sulfate, propylene glycol, and sodium lactate at a ratio of 1.0:0.025:0.167 were added and mixed. Thereafter, the mixture was cured for 30 minutes by a dryer at 60° C. After the curing, the product was put into a mayonnaise jar having a capacity of 225 ml and containing 10 g of glass beads, and then shaken for 10 minutes by a paint shaker. Thus obtained was an aluminum-surface-treated polymer (F3).

Comparative Example 4

The coarse-grained dry polymer (D4) was pulverized with use of a roll granulator (having a clearance of 10 mm/5 mm), and then classified with use of sieves respectively having a mesh size of 850 μm and a mesh size of 150 μm. Thus obtained were particles, having a weight-average particle diameter of 397 μm, most of which had a particle diameter of 150 μm to 850 μm. A surface-treated polymer (G3) and an aluminum-surface-treated polymer (H3) were obtained through the same operation as in Example 5 except that the particles were treated with heat for 55 minutes instead of 40 minutes.

<Comparison of Properties>

Table 1 tabulates the properties of the aluminum-surface-treated polymers (F3) and (H3).

TABLE 1

| | | Absorption capacity GV (g/g) | Absorbency against pressure AAP 0.7 Psi (g/g) | Saline flow conductivity SFC ($10^{-7} \cdot cm^3 \cdot s \cdot g^{-1}$) |
|---|---|---|---|---|
| Example 5 | Aluminum-surface-treated polymer (F3) | 30 | 24.2 | 54 |
| Comparative Example 4 | Aluminum-surface-treated polymer (H3) | 30 | 23.2 | 49 |

As shown in Table 1, a comparison between Example 5 and Comparative Example 4 shows that as compared with the aluminum-surface-treated polymer (H3), the aluminum-surface-treated polymer (F3) had improvements in properties AAP 0.7 Psi and SFC at a GV of 30. That is, it became obvious that the properties of an aluminum-surface-treated polymer are improved by performing pulverization between first drying and second drying instead of performing drying directly on coarse particles.

Example 6

The particulate hydrous cross-linked polymer (b) was poured in an amount of 21.5 kg into a conduction flow dryer set in advance to a hot-air temperature of 140° C. and a wind speed of 2.4 m/sec, and then dried for 18 minutes. Thus obtained was a dry polymer (first drying). The operation was performed five times. Thus obtained were 90 kg of a dry polymer (A5) having a moisture content of 13.4 wt %. The weight-average particle diameter of the dry polymer (A5) was 2.5 mm.

The first dry polymer (A5) was pulverized with use of a turbo grinder at revolutions per minute of 3,000 rpm. The turbo grinder, used for collecting the pulverized polymer, included a blower and a cyclone. Thus obtained was a particulate pulverized polymer (B5).

Subsequently, 23.0 kg of the particulate pulverized polymer (B5) thus obtained were poured into a conduction flow dryer set in advance to a hot-air temperature of 200° C., a wind speed of 0.5 m/sec, and a heat-transfer-tube temperature of 200° C., and then dried for 40 minutes. Thus obtained was a second dry polymer (C5) having a moisture content of 1.6 wt % (second drying).

Example 7

The particulate hydrous cross-linked polymer (b) was poured in an amount of 21.5 kg into a conduction flow dryer set in advance to a hot-air temperature of 180° C. and a wind speed of 2.4 m/sec, and then dried for 18 minutes. Thus obtained was a dry polymer (first drying). The operation was performed five times. Thus obtained were 90 kg of a dry polymer (A6) having a moisture content of 10.2 wt %. The weight-average particle diameter of the dry polymer (A6) was 2.5 mm.

The first dry polymer (A6) was pulverized with use of a turbo grinder at revolutions per minute of 2,000 rpm. The turbo grinder, used for collecting the pulverized polymer, included a blower and a cyclone. Thus obtained was a particulate pulverized polymer (B6).

Subsequently, 23.0 kg of the particulate pulverized polymer (B6) thus obtained were poured into a conduction flow dryer set in advance to a hot-air temperature of 200° C., a wind speed of 0.5 m/sec, and a heat-transfer-tube temperature of 200° C., and then dried for 40 minutes. Thus obtained was a second dry polymer (C6) having a moisture content of 1.3 wt % (second drying).

Example 8

The particulate hydrous cross-linked polymer (b) was poured in an amount of 21.5 kg into a conduction flow dryer set in advance to a hot-air temperature of 180° C. and a wind speed of 2.4 m/sec, and then dried for 11 minutes. Thus obtained was a dry polymer (first drying). The operation was performed five times. Thus obtained were 90 kg of a dry polymer (A7) having a moisture content of 10.0 wt %. The weight-average particle diameter of the dry polymer (A7) was 2.4 mm.

The first dry polymer (A7) was pulverized with use of a roll granulator (having a clearance of 10 mm/5 mm). Thus obtained was a particulate pulverized polymer (B7).

Subsequently, 20.0 kg of the particulate pulverized polymer (B7) thus obtained were poured into a conduction flow dryer set in advance to a hot-air temperature of 180° C., a wind speed of 0.5 m/sec, and a heat-transfer-tube temperature of 180° C., and then dried for 40 minutes. Thus obtained was a second dry polymer (C7) having a moisture content of 2.3 wt % (second drying).

Example 9

The second dry polymer (C5) obtained in Example 6 was classified with use of sieves respectively having a mesh size of 850 μm and a mesh size of 150 μm. Thus obtained were particles, having a weight-average particle diameter of 395 μm, most of which had a particle diameter of 150 μm to 850 μm. To and with 500 g of the particles thus classified, 17.55 g of an surface-cross-linking-agent-containing aqueous solution composed of 1,4-butanediol, propylene glycol, and water at a ratio of 0.34:0.56:3.0 were sprayed and mixed with use of a Lodige mixer. Thereafter, the mixture was treated with heat for 30 minutes with use of a mortar mixer set in advance to an oil-bath temperature of 205° C. After the heat treatment, the product was classified with use of a sieve having a mesh size of 850 μm. Thus obtained was a surface-treated polymer (E4).

Then, 35 g of the surface-treated polymer (E4) and 10 g of glass beads were put into a mayonnaise jar having a capacity of 225 ml, and then shaken for 30 minutes by a paint shaker. Next, to and with 30 g of the powder thus shaken, 0.36 g of a liquid-permeability improver composed of 50% aluminum sulfate, propylene glycol, and sodium lactate at a ratio of 1.0:0.025:0.167 were added and mixed. Thereafter, the mixture was cured for 30 minutes by a dryer at 60° C. After the curing, the product was put into a mayonnaise jar having a capacity of 225 ml and containing 10 g of glass beads, and then shaken for 10 minutes by a paint shaker. Thus obtained was an aluminum-surface-treated polymer (F4).

Example 1

The second dry polymer (C6) obtained in Example 7 was classified with use of sieves respectively having a mesh size of 850 μm and a mesh size of 150 μm. Thus obtained were particles, having a weight-average particle diameter of 386 μm, most of which had a particle diameter of 150 μm to 850 μm.

A surface-treated polymer (E5) was obtained through the same operation as in Example 9 except that the second dry polymer (C5) was replaced by the second dry polymer (C6) and that the heat-treatment time was changed from 30 minutes to 45 minutes. Then, a surface-treated polymer (F5) was obtained through the same operation as in Example 9 except that the surface-treated polymer (E4) was replaced by the aluminum-surface-treated polymer (F5).

Example 11

The second dry polymer (C7) obtained in Example 8 was classified with use of sieves respectively having a mesh size of 850 μm and a mesh size of 150 μm. Thus obtained were particles, having a weight-average particle diameter of 412 μm, most of which had a particle diameter of 150 μm to 850 μm.

A surface-treated polymer (E6) was obtained through the same operation as in Example 9 except that the second dry polymer (C5) was replaced by the second dry polymer (C7) and that the heat-treatment time was changed from 30 minutes to 65 minutes. Then, a surface-treated polymer (F6) was obtained through the same operation as in Example 9 except that the surface-treated polymer (E4) was replaced by the surface-treated polymer (F6).

[Example of Production 2]

A neutralization liquid was continuously prepared by mixing 13.3 g of a 48.5 wt % sodium hydroxide aqueous solution, 45.5 g of an acrylic acid, and 19.8 g of industrial purified water.

The neutralization liquid, a 48.5 wt % sodium hydroxide aqueous solution, and a 20 wt % polyethylene glycol diacrylate (average molecular weight 523) were continuously supplied to a mixer at flow rates of 78.6 g/sec, 23.3 g/sec, and 0.199 g/sec, respectively. Thus prepared was a monomer aqueous solution having a temperature of 95° C. to 100° C.

To the monomer aqueous solution thus prepared, a 46 wt % diethylenetriamine pentaacetic acid trisodium aqueous solution (flow rate 0.0278 g/sec) and a 4.0 wt % sodium persulfate aqueous solution was further added at a flow rate of 0.635 g/sec. After that, the monomer aqueous solution was continuously supplied onto an endless belt running at a speed of 7 m/min. The monomer aqueous solution continuously supplied onto the belt started immediately to polymerize. Thus obtained was a band-like hydrogel sheet.

The hydrogel sheet was continuously roughly crushed (segmentalized) with use of a cutter mill (marketed as "RC450"; manufactured by YOSHIKOH) having a screen having a diameter of 8 mm. Thus obtained was a particulate hydrous cross-linked polymer (c) having a size of approximately 1 mm to 3 mm. At this time, the particulate hydrous cross-linked polymer (c) had a moisture content of 29 wt %.

The particulate hydrous cross-linked polymer (c) was continuously poured into a fluidized-bed dryer (marketed as "CT-FBD-0.91m²"; manufactured by Nara Machinery Co., Ltd.; fluidized-bed length 800 mm/fluidize-bed width 550 mm=1.45) in an amount of 280 kg/h. The interior of the fluidized-bed was divided into three rooms by two partition plates at a ratio of approximately 2:2:1 in the length direction. The wind speed of hot air of the dryer was 2.4 m/sec. The temperature of hot air in the first drying room was 130° C., and the temperature of hot air in the second and third drying room was 190° C. The dryer had outlets respectively provided above and below a flow section, and the ratio of the amount of the dry polymer extracted from the upper outlet to the amount of the dry polymer extracted from the lower outlet was 4/1. The amount of the particulate hydrous cross-linked polymer (c) to be accumulated was controlled in accordance with the height of a weir provided at the upper outlet. The height of the fluidized bed during the drying was approximately 900 mm, and the average time during which the particulate hydrous cross-linked polymer (c) stayed in the dryer was approximately 50 minutes.

The dry polymer (A2) thus extracted from the dryer was pneumatically conveyed, crushed by a roll mill, and classified continuously with use of sieves respectively having a mesh size of 850 μm and a mesh size of 213 μm. Thus obtained was a particulate pulverized polymer (B2), having a weight-average particle diameter of 480 μm, most of which had a particle diameter of 150 μm to 850 μm. The particulate pulverized polymer (B2) was sampled. The moisture content of the sample was measured to be 8.7 wt %.

Example 12

A surface cross-linking agent aqueous solution containing 8.7 wt % of 1,4-butanediol and 14.4 wt % of propylene glycol was sprayed into a mixer (marketed as "Turbulizer") in an amount of 1.4 kg/h so as to be mixed with 36 kg/h of the particulate pulverized polymer (B2).

A mixture of the particulate pulverized polymer (B2) and the surface cross-linking agent aqueous solution was continuously discharged. The mixture was continuously treated with heat by being poured into a conduction flow dryer (marketed as "FCA-2"; manufactured by OKAWARA MFG. CO., LTD., fluidized-bed length 850 mm/fluidized-bed width 240 mm=3.54, surface area of heat transfer tube/area of air-blowing portion of fluidized bed=4.1) set in advance to a hot-air temperature of 215° C., a wind speed of 0.5 m/sec, and a heat-transfer-tube temperature of 215° C. The interior of the fluidized bed was divided into seven rooms by six partition plates at substantially regular intervals in the length direction. Each of the partition plates had an opening so provided in a one-side lower portion as to allow the movement of the material (the ratio of the area of the partition plate to the area of the opening=100/8). Further, the openings of the partition plates are provided so that the particulate pulverized polymer meanders through the fluidized-bed dryer from the inlet to the outlet (see FIG. 3). The height of the fluidized bed during the heat treatment was approximately 300 mm, and the residence time calculated from the amount accumulated was approximately 45 minutes.

The discharged polymer was sampled as a surface-treated polymer (E7) when the internal temperature of the fluidized bed was stabilized, i.e., 100 minutes after the start of input. The properties of the surface-treated polymer (E7) was measured to find that GV=27 (g/g), AAP 0.7 psi=23.5 (g/g), and SFC=70 ($10^{-7}·cm^3·s·g^{-1}$).

Comparative Example 5

A surface-treated polymer (E8) was obtained through the same operation as in Example 12 except that the interior of a fluidized bed of a fluidized-bed dryer for use in heat treatment was divided into three rooms by two similar partition plates placed at substantially regular intervals. The properties of the surface-treated polymer (E8) was measured to find that GV=27 (g/g), AAP=23.0 (g/g), and SFC=50 ($10^{-7}·cm^3·s·g^{-1}$).

<Comparison of Properties>

Table 2 shows the properties of the second dry polymer (C5), the second dry polymer (C6), and the second dry polymer (C7).

TABLE 2

| | | Solid content (wt %) | Absorption capacity GV (g/g) | Extractable polymer content (wt %) | GEX value | Swelling pressure of gel layer SPGL(B) (kdyne/cm²) |
|---|---|---|---|---|---|---|
| Example 6 | Second dry polymer (C5) | 98.4 | 33.6 | 7.1 | 25.8 | 48.0 |
| Example 7 | Second dry polymer (C6) | 98.7 | 40.3 | 12.1 | 23.0 | 44.5 |

TABLE 2-continued

| | | Solid content (wt %) | Absorption capacity GV (g/g) | Extractable polymer content (wt %) | GEX value | Swelling pressure of gel layer SPGL(B) (kdyne/cm²) |
|---|---|---|---|---|---|---|
| Example 8 | Second dry polymer (C7) | 97.7 | 35.3 | 10.5 | 22.2 | 32.5 |

Table 3 shows the properties of the surface-treated polymer (E4), the surface-treated polymer (E5), and the surface-treated polymer (E6).

TABLE 3

| | | Absorption capacity GV (g/g) | Absorbency against pressure AAP 0.7 Psi (g/g) | Saline flow conductivity SFC ($10^{-7} \cdot cm^3 \cdot s \cdot g^{-1}$) |
|---|---|---|---|---|
| Example 9 | Surface-treated polymer (E4) | 27.0 | 24.5 | 76 |
| Example 10 | Surface-treated polymer (E5) | 27.0 | 24.2 | 58 |
| Example 11 | Surface-treated polymer (E6) | 27.0 | 24.0 | 52 |

Table 4 shows the properties of the aluminum-surface-treated polymer (F4), the aluminum-surface-treated polymer (F5), and the aluminum-surface-treated polymer (F6).

TABLE 4

| | | Absorption capacity GV (g/g) | Absorbency against pressure AAP 0.7 Psi (g/g) | Saline flow conductivity SFC ($10^{-7} \cdot cm^3 \cdot s \cdot g^{-1}$) |
|---|---|---|---|---|
| Example 9 | Aluminum-surface-treated polymer (F4) | 27.0 | 25.5 | 105 |
| Example 10 | Aluminum-surface-treated polymer (F5) | 27.0 | 24.2 | 85 |
| Example 11 | Aluminum-surface-treated polymer (F6) | 27.0 | 23.0 | 70 |

[Example of Production 3]

A 48.5 wt % sodium hydroxide aqueous solution, an acrylic acid, a mixed solution of a 30 wt % polyethylene glycol diacrylate (average molecular weight 523) aqueous solution (flow rate 0.0513 g/sec) and a 46 wt % diethylenetriamine pentaacetic acid trisodium aqueous solution (flow rate 0.0016 g/sec), and water were continuously supplied to a mixer at flow rates of 9.7 g/sec, 12.1 g/sec, 0.0529 g/sec, and 5.286 g/sec, respectively. Thus prepared was a monomer aqueous solution having a temperature of 103° C.

To the monomer aqueous solution thus prepared, a 1.0 wt % sodium persulfate aqueous solution was further added at a flow rate of 0.589 g/sec. After that, the monomer aqueous solution was continuously supplied onto an endless belt, kept at a temperature of approximately 100° C., which was running at a speed of 230 cm/min. The monomer aqueous solution continuously supplied onto the belt started immediately to polymerize. Thus obtained was a band-like hydrogel sheet (hydrogel polymer).

The hydrogel sheet was continuously roughly crushed (segmentalized) with use of a cutter mill (marketed as "U-280"; manufactured by HORAI) having a screen having a diameter of 8 mm. Thus obtained was a particulate hydrous cross-linked polymer (d) having a temperature of approximately 35° C. and a size of approximately 2 mm to 5 mm. At this time, the particulate hydrous cross-linked polymer (d) had a moisture content of 29 wt %.

Example 13

The particulate hydrous cross-linked polymer (d) was poured in an amount of 21.5 kg into a conduction flow dryer (marketed as "FCA-2"; manufactured by OKAWARA MFG. CO., LTD., fluidized-bed length 850 mm/fluidized-bed width 240 mm=3.54) set in advance to a hot-air temperature of 180° C., a wind speed of 2.4 m/sec, and a heat-transfer-tube temperature of 180° C., and then dried for 11 minutes. Thus obtained was a dry polymer (first drying). This operation was performed for five times. Thus obtained were 90 kg of a dry polymer (J1) having a moisture content of 10.0 wt %. The weight-average particle diameter of the dry polymer (J1) was 2.4 mm.

Subsequently, the dry polymer (J1) was pulverized with use of a roll granulator (having a clearance of 10 mm/5 mm). Thus obtained was a particulate pulverized polymer (K1) (particle-size-controlled water absorbent resin particles) having a weight-average particle diameter of 410 μm.

Next, the particulate pulverized polymer (K1) thus obtained was poured in an amount of 20.0 kg into a conduction flow dryer set in advance to a hot-air temperature of 180° C. and a wind speed of 0.5 m/sec, and then dried for 40 minutes (second drying). Thus obtained was a dry polymer (L1) having a moisture content of 4.3 wt %.

Comparative Example 6

A dry polymer (J1) was obtained through the same operation as in Example 13 (first drying).

Subsequently, the dry polymer (J1) was poured in an amount of 14.0 kg into a conduction flow dryer set in advance to a hot-air temperature of 180° C. and a wind speed of 2.4 m/sec, and then dried for 40 minutes. Thus obtained was a coarse-grained dry polymer (M1) having a moisture content of 3.6 wt % (second drying).

Example 14

With Heat Drying After Particle Size Control

The pulverized dry polymer (L1) obtained in Example 13 was classified with use of sieves respectively having a mesh size of 850 μm and a mesh size of 150 μm. Thus obtained were particles, having a weight-average particle diameter of 414 μm, most of which had a particle diameter of 150 μm to 850 μm. To and with 400 g of the particles thus classified, 14.04 g of an surface-cross-linking-agent-containing aqueous solution composed of 1,4-butanediol, propylene glycol, and water at a ratio of 0.34:0.56:3.0 were sprayed and mixed with use of a Lodige mixer. Thereafter, the mixture was treated with heat for 40 minutes with use of a mortar mixer set in advance to an oil-bath temperature of 205° C. After the heat treatment, the product was classified with use of a sieve having a mesh size of 850 μm. Thus obtained was a surface-treated polymer (Ni) (surface cross-linked water absorbent resin).

Then, 35 g of the surface-treated polymer (Ni) and 10 g of glass beads were put into a mayonnaise jar having a capacity of 225 ml, and then shaken for 30 minutes by a paint shaker. Next, to and with 30 g of the powder thus shaken, 0.36 g of a liquid-permeability improver composed of 50% aluminum sulfate, propylene glycol, and sodium lactate at a ratio of 1.0:0.025:0.167 were added and mixed. Thereafter, the mixture was cured for 30 minutes by a dryer at 60° C. After the curing, the product was put into a mayonnaise jar having a capacity of 225 ml and containing 10 g of glass beads, and then shaken for 10 minutes by a paint shaker. Thus obtained was an aluminum-surface-treated polymer (O1).

Comparative Example 7

Without Heat Drying After Particle Size Control

The coarse-grained dry polymer (M1) was pulverized with use of a roll granulator (having a clearance of 10 mm/5 mm), and then classified with use of sieves respectively having a mesh size of 850 μm and a mesh size of 150 μm. Thus obtained were particles, having a weight-average particle diameter of 397 μm, most of which had a particle diameter of 150 μm to 850 μm. A surface-treated polymer (P1) and an aluminum-surface-treated polymer (Q1) were obtained through the same operation as in Example 14 except that the particles were treated with heat for 55 minutes instead of 40 minutes.

<Comparison of Properties>

Table 5 tabulates the properties of the aluminum-surface-treated polymers (O1) and (Q1).

TABLE 5

|  |  | Absorption capacity GV (g/g) | Absorbency against pressure AAP 0.7 Psi (g/g) | Saline flow conductivity SFC ($10^{-7} \cdot cm^3 \cdot s \cdot g^{-1}$) |
|---|---|---|---|---|
| Example 14 | Aluminum-surface-treated polymer (O1) | 30 | 24.2 | 54 |
| Comparative Example 7 | Aluminum-surface-treated polymer (Q1) | 30 | 23.2 | 49 |

As shown in Table 5, a comparison between Example 14 (with second drying after particle size control, with a moisture content of 4.3%) and Comparative Example 7 (without second drying, with a moisture content of 3.6%) shows that as compared with the aluminum-surface-treated polymer (Q1), the aluminum-surface-treated polymer (O1) had improvements in properties AAP 0.7 Psi and SFC at a GV of 30. That is, it became obvious that the properties of an aluminum-surface-treated polymer are improved by performing second drying after particle size control instead of omitting to perform second drying. [Example of Production 4]

A neutralization liquid was continuously prepared by mixing 13.3 g of a 48.5 wt % sodium hydroxide aqueous solution, 45.5 g of an acrylic acid, and 19.8 g of industrial purified water.

The neutralization liquid, a 48.5 wt % sodium hydroxide aqueous solution, and a 20 wt % polyethylene glycol diacrylate (average molecular weight 523) were continuously supplied to a mixer at flow rates of 78.6 g/sec, 23.3 g/sec, and 0.199 g/sec, respectively. Thus prepared was a monomer aqueous solution having a temperature of 95° C. to 100° C.

To the monomer aqueous solution thus prepared, a 46 wt % diethylenetriamine pentaacetic acid trisodium aqueous solution (flow rate 0.0278 g/sec) and a 4.0 wt % sodium persulfate aqueous solution was further added at a flow rate of 0.635 g/sec. After that, the monomer aqueous solution was continuously supplied onto an endless belt running at a speed of 7 m/min. The monomer aqueous solution continuously supplied onto the belt started immediately to polymerize. Thus obtained was a band-like hydrogel sheet (hydrogel polymer).

The hydrogel sheet was continuously roughly crushed (segmentalized) with use of a cutter mill (marketed as "RC450"; manufactured by YOSHIKOH) having a screen having a diameter of 8 mm. Thus obtained was a particulate hydrous cross-linked polymer (e) having a size of approximately 1 mm to 3 mm. At this time, the particulate hydrous cross-linked polymer (e) had a moisture content of 29 wt %.

The particulate hydrous cross-linked polymer (e) was continuously poured into a fluidized-bed dryer (marketed as "CT-FBD-0.91 m²"; manufactured by Nara Machinery Co., Ltd.; fluidized-bed length 800 mm/fluidize-bed width 550 mm=1.45) in an amount of 280 kg/h. The interior of the fluidized-bed was divided into three rooms by two partition plates at a ratio of approximately 2:2:1 in the length direction. The wind speed of hot air of the dryer was 2.4 m/sec. The temperature of hot air in the first drying room was 130° C., and the temperature of hot air in the second and third drying room was 190° C. The dryer had outlets respectively provided above and below a flow section, and the ratio of the amount of the dry polymer extracted from the upper outlet to the amount of the dry polymer extracted from the lower outlet was 4/1. The amount of the particulate hydrous cross-linked polymer (e) to be accumulated was controlled in accordance with the height of a weir provided at the upper outlet. The height of the fluidized bed during the drying was approximately 900 mm, and the average time during which the particulate hydrous cross-linked polymer (e) stayed in the dryer was approximately 50 minutes.

The dry polymer (J2) thus extracted from the dryer was pneumatically conveyed, crushed by a roll mill, and classified continuously with use of sieves respectively having a mesh size of 850 μm and a mesh size of 213 μm. Thus obtained was a particulate pulverized polymer (K2), having a weight-average particle diameter of 480 μm, most of which had a particle diameter of 150 μm to 850 μm. The particulate pulverized polymer (K2) was sampled. The moisture content of the sample was measured to be 8.7 wt %.

Example 15

The particulate pulverized polymer (K2) was poured in an amount of 500 g into a fluidized-bed dryer (marketed as "Spray Dryer Pulvis GB-22"; manufactured by Yamato Scientific Co., Ltd.) set in advance to a hot-air temperature of 220° C. A mantle heater was attached to the glass cell of the fluidized-bed section of the dryer and heated in advance to 200° C. After 40 minutes of heat drying, a heat-dried polymer (L2) was taken out. The moisture content of the heat-dried polymer (L2) was measured to be 1.3 wt %. Further, as compared with the particulate pulverized polymer (K2), the heat-dried polymer (L2) showed an increase of 7.3 g/g in absorption capacity GV (solid content correction value), excluding contained moisture.

Example 16

The particulate pulverized polymer (K2) was poured in an amount of 500 g into the fluidized-bed dryer of Example set in advance to a hot-air temperature and mantle-heater temperature of 180° C. After 40 minutes of heat drying, a heat-dried polymer (L3) was taken out. The moisture content of the heat-dried polymer (L3) was measured to be 2.7 wt %. Further, as compared with the particulate pulverized polymer (K2), the heat-dried polymer (L3) showed an increase of 2.5 g/g in absorption capacity GV (solid content correction value), excluding contained moisture.

Example 17

The particulate pulverized polymer (K2) was continuously poured at 40 kg/h into the conduction flow dryer of Example 13 set in advance to a hot-air temperature and heat-transfer-tube temperature of 210° C. and a wind speed of 0.5 m/sec, and then dried by heating. It should be noted that the interior of the fluidized bed was divided into four rooms by three partition plates placed at substantially regular intervals in the length direction. The height of the fluidized bed during the drying by heating was approximately 250 mm, and the average time during which the particulate pulverized polymer (K2) stayed in the dryer was 40 minutes. A heat-dried polymer (L4) discharged from the dryer through an outlet when the internal temperature of the bed was stabilized was sampled. The moisture content of the sample was measured to be 1.1 wt %. Further, as compared with the particulate pulverized polymer (K2), the heat-dried polymer (L4) showed an increase of 9.4 g/g in absorption capacity GV (solid content correction value), excluding contained moisture.

Example 18

With Heat Drying After Particle Size Control (With a Moisture Content of 1.3 wt %)

To and with 500 g of the heat-dried polymer (L2) obtained in Example 15 (with heat drying after particle size control) with a moisture content of 1.3 wt %, 17.55 g of an surface-cross-linking-agent-containing aqueous solution composed of 1,4-butanediol, propylene glycol, and water at a ratio of 0.34:0.56:3.0 were sprayed and mixed with use of a Lodige mixer. Thereafter, the mixture was treated with heat for 30 minutes with use of a mortar mixer set in advance to an oil-bath temperature of 207° C. After the heat treatment, the product was classified with use of a sieve having a mesh size of 850 μm. Thus obtained was a surface cross-linked polymer (N2).

Example 19

With Heat Drying After Particle Size Control (With a Moisture Content of 2.7 wt %)

A surface cross-linked polymer (N3) was obtained through the same operation as in Example 17 except that the heat-dried polymer (L3) (with a moisture content of 2.7 wt %) was used in place of the heat-dried polymer (L2) in Example(s) 17 (and 18) and the heat treatment time after the mixing of the surface cross-linking agent was changed to 25 minutes.

Example 20

With Heat Drying After Particle Size Control (With a Moisture Content of 1.1 wt %)

A surface cross-linked polymer (N4) was obtained through the same operation as in Example 17 except that the heat-dried polymer (L4) (with a moisture content of 1.1 wt %) was used in place of the heat-dried polymer (L2) in Example(s) 17 (and 18) and the heat treatment time after the mixing of the surface cross-linking agent was changed to 35 minutes.

Comparative Example 8

Without Heat Drying After Particle Size Control

To and with 500 g of the particulate pulverized polymer (K2) obtained in Example of Production 4 (without heat drying after particle size control) with a moisture content of 8.7 wt %, 19.5 g of an surface-cross-linking-agent-containing aqueous solution composed of 1,4-butanediol, propylene glycol, and water at a ratio of 0.34:0.56:3.0 were sprayed and mixed with use of a Lodige mixer. Thereafter, the mixture was treated with heat for 30 minutes with use of a mortar mixer set in advance to an oil-bath temperature of 207° C. After the heat treatment, the product was classified with use of a sieve having a mesh size of 850 μm. Thus obtained was a surface cross-linked polymer (R5).

<Comparison of Properties>

Table 6 tabulates the properties of the surface cross-linked polymers (N2, N3, R5). As shown in Table 6 below, with heat drying after particle size control or with a moisture content of not more than 3 wt % before surface crosslinking, there is improvement in absorbency against pressure (AAP); furthermore, there is dramatic improvement in liquid permeability (SFC).

TABLE 6

| | | Absorption capacity GV (g/g) | Absorbency against pressure AAP 0.7 Psi (g/g) | Saline flow conductivity SFC ($10^{-7} \cdot cm^3 \cdot s \cdot g^{-1}$) |
|---|---|---|---|---|
| Example 18 | Surface cross-linked polymer (N2) | 30.3 | 25.7 | 52 |
| Example 19 | Surface cross-linked polymer (N3) | 29.8 | 25.0 | 32 |
| Comparative Example 8 | Surface cross-linked polymer (R5) | 29.8 | 24.4 | 20 |

Example 21

In this example, 35 g of the surface cross-linked polymer (N4) and 10 g of glass beads were put into a mayonnaise jar having a capacity of 225 ml, and then shaken for 30 minutes by a paint shaker. Next, to and with g of the powder thus shaken, 0.3 g of a liquid-permeability improver composed of 50% aluminum sulfate, propylene glycol, and sodium lactate at a ratio of 1.0:0.025:0.3 were added and mixed. Thereafter, the mixture was cured for 30 minutes by a dryer at 60° C. After the curing, the product was put into a mayonnaise jar having a capacity of 225 ml and containing 10 g of glass beads, and then shaken for 10 minutes by a paint shaker. Thus obtained was an aluminum-surface-treated polymer (O4).

Table 7 tabulates the properties of the surface-treated polymer (N4) and the aluminum-surface-treated polymer (O4). As shown in Table 7 below, even with continuous surface crosslinking, which is likely to cause degradation in properties, there is no degradation in properties. Even when the heat-drying step was performed in the continuous heat dryer, the properties were obtained which are equivalent to those obtained, as shown in Table 7, when heat drying was performed in a batch-wise heat dryer.

TABLE 7

|  |  | Absorption capacity GV (g/g) | Absorbency against pressure AAP 0.7 Psi (g/g) | Saline flow conductivity SFC ($10^{-7} \cdot cm^3 \cdot s \cdot g^{-1}$) |
|---|---|---|---|---|
| Example 20 | Surface-treated polymer (N4) | 30.5 | 25.2 | 41 |
| Example 21 | Aluminum-surface-treated polymer (O4) | 30.9 | 24.3 | 63 |

A method of the present invention for producing a water absorbent resin brings about an effect of making it possible to efficiently obtain a particulate water absorbent resin of excellent properties at low cost with high productivity.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

As described above, a method of the present invention for producing a water absorbent resin dries a dried polymer without reducing the effectiveness of water absorbent properties and the like. For this reason, a particulate water absorbent resin obtained by the method of the present invention for producing a water absorbent resin exhibits excellent water absorbent properties and the like. Such a particulate water absorbent resin can be widely used, for example, as an absorbing agent for use in sanitary materials such as adult disposable diapers that have been remarkably developed in recent years, children's disposable diapers, sanitary napkins, so-called incontinence pads; as water-soluble polymers suitable for use in flocculating agents, setting agents, soil-improving agents, soil-stabilizing agents, thickening agents, and the like; or as water-holding agents, dehydrating agents, and the like in the field of agriculture/horticulture and civil engineering.

The invention claimed is:

1. A method for producing a polyacrylate salt water absorbent resin with use of a continuous fluidized-bed dryer to heat or dry a particulate hydrous cross-linked polymer, the method comprising:
performing cross-linking polymerization of an acrylic acid (salt) aqueous solution within a range of 10 wt % to 90 wt % in a method of one selected from the group consisting of spraying polymerization, dropping polymerization, aqueous polymerization, and reversed-phase polymerization, to obtain a particulate hydrous cross-linked polymer,
drying the particulate hydrous cross-linked polymer with use of a continuous fluidized-bed dryer having at least two drying rooms or with use of at least two continuous fluidized-bed dryers, to obtain water absorbent resin particles, each of the continuous fluidized-bed dryer containing a heat transfer tube in its fluidized bed; and
surface cross-linking the water absorbent resin particles.

2. The method as set forth in claim 1, wherein the fluidized bed has a floor-area ratio of not less than 3 to not more than 20 with respect to a surface area of the heat transfer tube.

3. The method as set forth in claim 1, wherein the continuous fluidized-bed dryer has at least three drying rooms.

4. The method as set forth in claim 1, further comprising drying with use of a continuous fluidized-bed dryer whose fluidized bed has a length-to-width ratio of not less than 2 to not more than 9 in a direction of movement of the fluidized bed.

5. The method as set forth in claim 1, wherein the continuous fluidized-bed dryer has a fluidized bed provided with a stepped floor.

6. The method as set forth in claim 1, wherein:
the particulate hydrous cross-linked polymer is dried at a drying temperature of not less than 80° C. to not more than 200° C. in an early stage of the drying; and
the particulate hydrous cross-linked polymer is dried at a drying temperature of not less than 100° C. to not more than 220° C. in a later stage of the drying.

7. The method as set forth in claim 1, further comprising performing pulverization of a particulate hydrous cross-linked polymer once dried with the continuous fluidized-bed dryer and then further drying the particulate hydrous cross-linked polymer with the continuous fluidized-bed dryer.

8. A method for producing a water absorbent resin, comprising a sequence of the steps of:
(1) polymerizing a monomer aqueous solution;
(2) drying a hydrogel polymer obtained in the step (1);
(3) performing particle size control by either pulverizing or pulverizing and classifying a dry polymer obtained in the step (2); and
(5) performing surface crosslinking on water absorbent resin powder whose particle size has been controlled in the step (3),
the method further comprising the step (4) of performing second heat drying on the water absorbent resin powder whose particle size has been controlled in the step (3), the step (4) preceding the step (5).

9. The method as set forth in claim 8, wherein the step (4) is performed for not shorter than 10 minutes at a temperature of 150° C. to 300° C.

10. The method as set forth in claim 8, wherein the water absorbent resin has a moisture content (defined by a loss on drying performed for three hours at 180° C.) of 0 wt % to 3 wt % before it is subjected to the step (5).

11. A method for producing a water absorbent resin, comprising a sequence of the steps of:
(1) polymerizing a monomer aqueous solution;
(2) drying a hydrogel polymer obtained in the step (1);
(3) performing particle size control by either pulverizing or pulverizing and classifying a dry polymer obtained in the step (2); and
(5) performing surface crosslinking on water absorbent resin powder whose particle size has been controlled in the step (3),
the water absorbent resin having a moisture content (defined by a loss on drying performed for three hours at 180° C.) of 0 wt % to 3 wt % before it is subjected to the step (5).

12. The method as set forth in claim 11, further comprising the step (4) of performing second heat drying on the water absorbent resin powder whose particle size has been controlled in the step (3), the step (4) preceding the step (5).

13. The method as set forth in claim 11, wherein:
the dry polymer obtained in the step (2) has a weight-average particle diameter (defined by sieve classification) of 1 mm to 5 mm; and
the water absorbent resin powder whose particle size has been controlled in the step (3) has a weight-average particle diameter (defined by sieve classification) of 200 μm to 800 μm.

14. The method as set forth in claim 11, wherein the hydrogel polymer has been granulated after or during polymerization.

15. The method as set forth in claim 12, further comprising using a fluidized-bed dryer for drying in the step (2) or (4).

16. The method as set forth in claim 11, wherein the water absorbent resin is a polyacrylate salt water absorbent resin that satisfies at least one of the following properties:
(a) an absorption capacity without pressure (GV) with respect to 0.9 wt % sodium chloride aqueous solution, of 20 g/g to 100 g/g;
(b) an absorbency against pressure (AAP) under a pressure of 0.7 Psi with respect to 0.9 wt % sodium chloride aqueous solution, falling within a range of not less than 10 g/g to not more than 28 g/g; and
(c) a saline flow conductivity (SFC) of at least 10 ($10^{-7} \cdot cm^3 \cdot s \cdot g^{-1}$).

17. The method as set forth in claim 8, wherein: the dry polymer obtained in the step (2) has a weight-average particle diameter (defined by sieve classification) of 1 mm to 5 mm; and the water absorbent resin powder whose particle size has been controlled in the step (3) has a weight-average particle diameter (defined by sieve classification) of 200 μm to 800 μm.

18. The method as set forth in claim 8, wherein the hydrogel polymer has been granulated after or during polymerization.

19. The method as set forth in claim 8, further comprising using a fluidized-bed dryer for drying in the step (2) or (4).

20. The method as set forth in claim 8, wherein the water absorbent resin is a polyacrylate salt water absorbent resin that satisfies at least one of the following properties:
(a) an absorption capacity without pressure (GV) with respect to 0.9 wt % sodium chloride aqueous solution, of 20 g/g to 100 g/g;
(b) an absorbency against pressure (AAP) under a pressure of 0.7 Psi with respect to 0.9 wt % sodium chloride aqueous solution, falling within a range of not less than 10 g/g to not more than 28 g/g; and
(c) a saline flow conductivity (SFC) of at least 10 ($10^{-7} \cdot cm^3 \cdot s \cdot g^{-1}$).

21. The method as set forth in claim 1, further comprising:
scattering a small amount of fine particles contained in the particulate hydrous cross-linked polymer together with exhaust fumes passing through an interior of the fluidized bed, to remove the fine particles from the fluidized bed, the fine particles being particles of less than 150 μm in terms of a standard sieve; and
catching the fine particles by a cyclone and a bag filter.

22. The method as set forth in claim 1, wherein
the particulate hydrous cross-linked polymer contains a solid content of not more than 90 wt %, the solid content being a contained solid content upon drying and reducing weight of the particulate hydrous cross-linked polymer at 180° C. for 3 hours, and
the water absorbent resin particles have a weight-average particle diameter falling within a range of 100 μm to 1000 μm.

23. The method as set forth in claim 1, further comprising;
mixing a surface cross-linking agent into the water absorbent resin particles, the surface cross-linking agent being added by an amount falling within a range of 0.001 parts by weight to 10 parts by weight with respect to 100 parts by weight of the water absorbent resin particles; and
mixing a liquid-permeability improver into the water absorbent resin particles into which the surface cross-linking agent has been mixed, the liquid-permeability improver being added by an amount falling within a range of 0.001 parts by weight to 5 parts by weight with respect to 100 parts by weight of the water absorbent resin particles.

24. The method as set forth in claim 23, wherein the liquid-permeability improver is selected from the group consisting of polyamines, polyvalent metal salts, and water-insoluble fine particles.

25. The method as set forth in claim 1, wherein the water absorbent resin is a polyacrylate salt water absorbent resin that satisfies the following three properties:
(a) an absorption capacity without pressure (GV) with respect to 0.9 wt % sodium chloride aqueous solution, of 20 g/g to 100 g/g;
(b) an absorbency against pressure (AAP) under a pressure of 0.7 Psi with respect to 0.9 wt % sodium chloride aqueous solution, falling within a range of not less than 10 g/g to not more than 28 g/g; and
(c) a saline flow conductivity (SFC) of at least 10 ($10^{-7} \cdot cm^3 \cdot s \cdot g^{-1}$).

26. A method for producing a polyacrylate salt water absorbent resin with use of a continuous fluidized-bed dryer to heat or dry a particulate hydrous cross-linked polymer, the method comprising:
performing cross-linking polymerization of an acrylic acid (salt) aqueous solution within a range of 10 wt % to 90 wt % in a method of either spraying polymerization or dropping polymerization, to obtain a particulate hydrous cross-linked polymer;
drying the particulate hydrous cross-linked polymer with use of a continuous fluidized-bed dryer having at least two drying rooms or with use of at least two continuous fluidized-bed dryers, to obtain water absorbent resin particles;
scattering a small amount of fine particles contained in the particulate hydrous cross-linked polymer together with exhaust fumes passing through an interior of the fluidized bed, to remove the fine particles from the fluidized bed, the fine particles being particles of less than 150 μm in terms of a standard sieve;
catching the fine particles by a cyclone and a bag filter;
surface cross-linking the obtained water absorbent resin particles.

\* \* \* \* \*